US008976966B2

(12) United States Patent
Yamazaki

(10) Patent No.: US 8,976,966 B2
(45) Date of Patent: Mar. 10, 2015

(54) INFORMATION PROCESSOR, INFORMATION PROCESSING METHOD AND SYSTEM

(75) Inventor: Masahito Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 12/396,628

(22) Filed: Mar. 3, 2009

(65) Prior Publication Data

US 2009/0225988 A1 Sep. 10, 2009

(30) Foreign Application Priority Data

Mar. 4, 2008 (JP) ................................ 2008-053908

(51) Int. Cl.
*H04L 9/08* (2006.01)
*H04L 29/06* (2006.01)
*G06F 3/12* (2006.01)

(52) U.S. Cl.
CPC ............ *H04L 9/0825* (2013.01); *H04L 63/045* (2013.01); *G06F 3/1203* (2013.01)
USPC ........... 380/277; 380/278; 713/150; 358/3.23

(58) Field of Classification Search
CPC .... H04L 9/0825; H04L 63/045; G06F 3/1203
USPC .................... 713/150; 380/277–278; 358/3.23
See application file for complete search history.

(56) References Cited

U.S. PATENT DOCUMENTS

| | | | | |
|---|---|---|---|---|
| 5,883,958 A * | 3/1999 | Ishiguro et al. | ................. | 705/57 |
| 6,470,085 B1 * | 10/2002 | Uranaka et al. | ............... | 380/231 |
| 6,550,011 B1 * | 4/2003 | Sims, III | ........................ | 713/193 |
| 6,636,968 B1 * | 10/2003 | Rosner et al. | ................. | 713/178 |
| 7,158,639 B2 * | 1/2007 | Benaloh | ........................... | 380/44 |
| 7,305,556 B2 * | 12/2007 | Slick et al. | .................... | 713/169 |
| 7,305,711 B2 * | 12/2007 | Ellison et al. | .................... | 726/29 |
| 7,336,384 B2 * | 2/2008 | Shima et al. | ................. | 358/1.15 |
| 7,599,890 B2 * | 10/2009 | Hori et al. | ........................ | 705/51 |
| 7,693,286 B2 * | 4/2010 | Sutton et al. | ................. | 380/282 |
| 7,694,142 B2 * | 4/2010 | Saw et al. | ..................... | 713/175 |
| 2001/0037462 A1 * | 11/2001 | Bengtson | ...................... | 713/201 |
| 2006/0018484 A1 * | 1/2006 | Yoshihiro et al. | ............. | 380/277 |
| 2006/0056625 A1 | 3/2006 | Nakabayashi et al. | .......... | 380/46 |
| 2006/0190715 A1 * | 8/2006 | Miller | ............................ | 713/150 |
| 2007/0234055 A1 * | 10/2007 | Ohara et al. | .................. | 713/170 |
| 2007/0241191 A1 * | 10/2007 | Onishi | .......................... | 235/435 |
| 2007/0260874 A1 * | 11/2007 | Adams et al. | ................. | 713/156 |
| 2008/0075284 A1 * | 3/2008 | Ellison et al. | ................. | 380/201 |

FOREIGN PATENT DOCUMENTS

JP 9-134264 5/1997
JP 2001-216198 A 8/2001

(Continued)

*Primary Examiner* — Yin-Chen Shaw
(74) *Attorney, Agent, or Firm* — Fitzpatrick, Cella, Harper & Scinto

(57) ABSTRACT

To prevent falsification of an attribute of data, a mechanism is provided, which encrypt document/image data while holding the attribute contained in electronic document data as a plain text and make it extremely difficult to decrypt the document/image data if the attribute is falsified. A transmitter receives a public key set including a plurality of public keys from a receiver, encrypts the document/image data using a common key, selects a public key from the public key set based on an attribute of the data, encrypts the common key using the selected public key, and transmits the data including the encrypted document/image data, the encrypted common key, and the attribute to the receiver.

15 Claims, 17 Drawing Sheets

(56) References Cited

FOREIGN PATENT DOCUMENTS

| JP | 2004-153472 A | 5/2004 |
|----|---------------|--------|
| JP | 2004-199409 A | 7/2004 |
| JP | 2004-287912 A | 10/2004 |
| JP | 2006-86777 | 3/2006 |
| JP | 2006-109428 | 4/2006 |

* cited by examiner

INFORMATION PROCESSOR, INFORMATION PROCESSING METHOD AND SYSTEM

BACKGROUND OF THE INVENTION

1. Field of the Invention

The present invention relates to an information processor having a function to transmit and receive data such as document/image data via a network.

2. Description of the Related Art

Electronic document data may consist of document/image data and attribute data (for example, print attributes). For example, print job data transmitted from a host computer or the like to a printer and digital multi-function apparatus includes document/image data and print attributes and printer operations are controlled by data of the print attributes.

Moreover, the electronic document data may be stored in devices in a network or transferred between devices. If image data input from an image input device such as a scanner is stored in a secondary memory device inside an image output device, such as a printing device in file format, a user can pick out images at a desired time to repeatedly print out images. A function to store image data in a secondary memory device of an image output device in file format for the purpose of reusing the image data in this manner is called a box function, and a file system to store image data is called a box. Content of a file in the box is bit map data read by a scanner and PDL data received from a host computer via a network. Such methods of storing data in devices in a network and handling of electronic documents transferred between devices are also controlled by attribute data.

Incidentally, limitations on handling of electronic document data are increasing from the viewpoint of ensuring security such as preventing leakage of information and functions to enhance security are also considered. Functions to enhance security include, for example, an upper limit setting of the number of permitted print copies, numbering of print copies for security control, and pattern printing (printing of a copy forgery inhibited pattern image). An upper limit setting of the number of print copies is to permit printing of only the minimum necessary number of copies by limiting the number of copies that may be printed. Numbering of print copies for security control is to attach numbers that do not mutually overlap to a plurality of printout copies. Accordingly, if a leakage of information occurs, the pathway of leakage can be identified by checking the number. In addition to numbers, information about history from generation to printing out of electronic document data may be attached. Pattern printing (i.e. printing of a copy forgery inhibited pattern image) is to perform overlay printing of a latent image pattern that is visually difficult to identify on printed matter by combining dots that are different in density and diameter. When printed matter having such a pattern is copied, an embedded latent image pattern is exposed to indicate a copy so that optical copies of the printed matter can be prevented.

In print jobs, usable functions may be limited for each user to save printing costs. Such limitations include, for example, permitting color printing only by specific users, forcing users other than certain permitted users to perform double-sided printing, and forcing users other than certain permitted users to use a reduced layout (N-in-1).

Such handling of electronic document data is also controlled by print attributes.

On the other hand, print attributes contained in normal electronic document data are described in plain text (data that is not encrypted) and thus, there is a possibility that a malicious third party can falsify print attributes.

There is a method by which a host computer, when transmitting print job data to an image output device such as a printer and digital multi-function apparatus, encrypts the print job data and transmits it to the image output device (Japanese Patent Laid-Open No. H09-134264/1997). This method is called a network secure print. In a network secure print, the host computer encrypts all print job data and thus, in addition to document/image data, print attributes are also encrypted. Print attributes include information about job control (e.g., whether or not a job is needed) and thus, an image output device cannot determine whether or not a job is needed before all received print job data is decrypted. Therefore, it is desirable that print attributes do not require decryption or can be decrypted by simple processing.

Similarly, if print attributes including information about the range in which data can be transferred, transfer history, and creator of an electronic document is in plain text when the electronic document data is transferred between devices, there is a possibility of the print attributes being falsified. However, it is efficient to perform transfer control of electronic documents based on print attributes only and thus, print attributes are preferably in plain text.

According to Japanese Patent Laid-Open No. 2006-86777, on the other hand, whether or not header information has been falsified can be determined by storing digital signature information in the header information (attribute data).

Japanese Patent Laid-Open No. 2006-86777 discloses a method of attaching an electronic signature to separated print attributes (plain text). While this method can prevent falsification of print attributes, new processing (electronic signature confirmation processing) to check that print attributes have not been falsified is needed. In addition, providing a control/authentication mechanism such as a policy server (registered trademark) in a network entails costs for installation/operation.

Japanese Patent Laid-Open No. 2006-109428, on the other hand, discloses a method of generating parameters for encryption based on metadata. This method uses metadata to generate a key stream for encryption of stream data. In this method, a common key encryption scheme is used in a generation process of a key stream. The value of security is lost in the common key encryption scheme when a malicious third party knows a common key and thus, sufficient care must be taken to control the common key in a process of distributing the common key.

SUMMARY OF THE INVENTION

An object of the present invention is to provide a mechanism to encrypt document/image data while holding attributes (e.g. print attributes) contained in electronic document data as plain text and make it extremely difficult to decrypt the document/image data if the attributes are falsified.

The present invention provides for an information processing apparatus transmitting data to another apparatus via a network, the apparatus comprising: a receiving unit for receiving a public key set including a plurality of public keys from the another apparatus, the public key set being paired with a secret key set held by the another apparatus; a generating unit for generating a common key; a first encrypting unit for encrypting data using the common key; a selecting unit for selecting a public key from the public key set based on an attribute of the data; a second encrypting unit for encrypting the common key using the selected public key; and a transmitting unit for transmitting data including the encrypted data, the encrypted common key, and the attribute to the another apparatus.

An information processing apparatus of the present invention comprises: a data receiving unit for receiving encrypted data, an attribute of the data, and an encrypted common key from another information processing apparatus via a network; a holding unit for holding a secret key set including a plurality of secret keys, the secret key set being paired with a public key set used by the another information processing apparatus; a secret key selecting unit for selecting a secret key from the secret key set based on the attribute of the data; a first decrypting unit for decrypting the encrypted common key using the selected secret key; and a second decrypting unit for decrypting the encrypted data using the decrypted common key.

A system of the present invention is one in which a first information processing apparatus and a second information processing apparatus mutually transmit and receive data via a network, wherein the first information processing apparatus, comprising: a receiving unit for receiving a public key set including a plurality of public keys from the second information processing apparatus, the public key set being paired with a secret key set held by the second information processing apparatus; a generating unit for generating a common key; a first encrypting unit for encrypting data using the common key; a public key selecting unit for selecting a public key from the public key set based on an attribute of the data; a second encrypting unit for encrypting the common key using the selected public key; and a transmitting unit for transmitting data including the encrypted data, the encrypted common key, and the attribute of the data to the second information processing apparatus via the network; and wherein the second information processing apparatus, comprising: a data receiving unit for receiving data including the encrypted data, the encrypted common key, and the attribute from the first information processing apparatus via the network; a holding unit for holding a secret key set including a plurality of secret keys, the secret key set being paired with a public key set used by the first information processing apparatus; a secret key selecting unit for selecting a secret key from the secret key set based on the attribute of the data; a first decrypting unit for decrypting the encrypted common key using the selected secret key; and a second decrypting unit for decrypting the encrypted data using the decrypted common key.

An information processing method of the present invention is one by which an information processing apparatus transmits data to another information processing apparatus via a network, the method comprising steps of: receiving a public key set including a plurality of public keys from the another apparatus, the public key set being paired with a secret key set held by the another information processing apparatus; generating a common key; encrypting data using the common key; selecting a public key from the public key set based on an attribute of the data; encrypting the common key using the selected public key; and transmitting data including the encrypted data, the encrypted common key, and the attribute to the another information processing apparatus.

An information processing method of the present invention is a method executed by an information processing apparatus holding a secret key set including a plurality of secret keys, the secret key set being paired with a public key set used by another information processing apparatus, the method comprising steps of: receiving encrypted data, an attribute of the data, and an encrypted common key from the another information processing apparatus via a network; selecting a secret key from the secret key set based on the attribute of the data; decrypting the encrypted common key using the selected secret key; and decrypting the encrypted data using the decrypted common key.

A computer readable recording medium of the present invention records therein a program for causing a computer to execute any of the above methods.

A program of the present invention causes a computer to execute any of the above methods.

According to the present invention, when, for example, electronic document data containing document/image data and print attributes is transmitted and received, while the document/image data is encrypted, the print attribute itself is plain text that is not encrypted and thus, readability of the print attribute will not be lowered. If the electronic document data is a printing job to a printer, a determination can be made by interpreting only the print attribute in plain text in processing by the printer to determine whether or not to accept the encrypted printing job.

If the print attribute in plain text is altered, an attempt will be made to decrypt encrypted document/image data or an encrypted common key using a secret key that is different from a secret key paired with a public key used for encryption, resulting in a failure of decryption.

According to the foregoing, prevention of falsification of print attributes can be made while the print attributes are in a readable plain text without any change.

Further features of the present invention will become apparent from the following description of exemplary embodiments (with reference to the attached drawings).

DESCRIPTION OF THE EMBODIMENTS

Preferred embodiments to carry out the present invention will be described below with reference to drawings. However, components described in these embodiments are illustrative only and do not limit the scope of the present invention thereto.

[First Embodiment]

Figure 1:
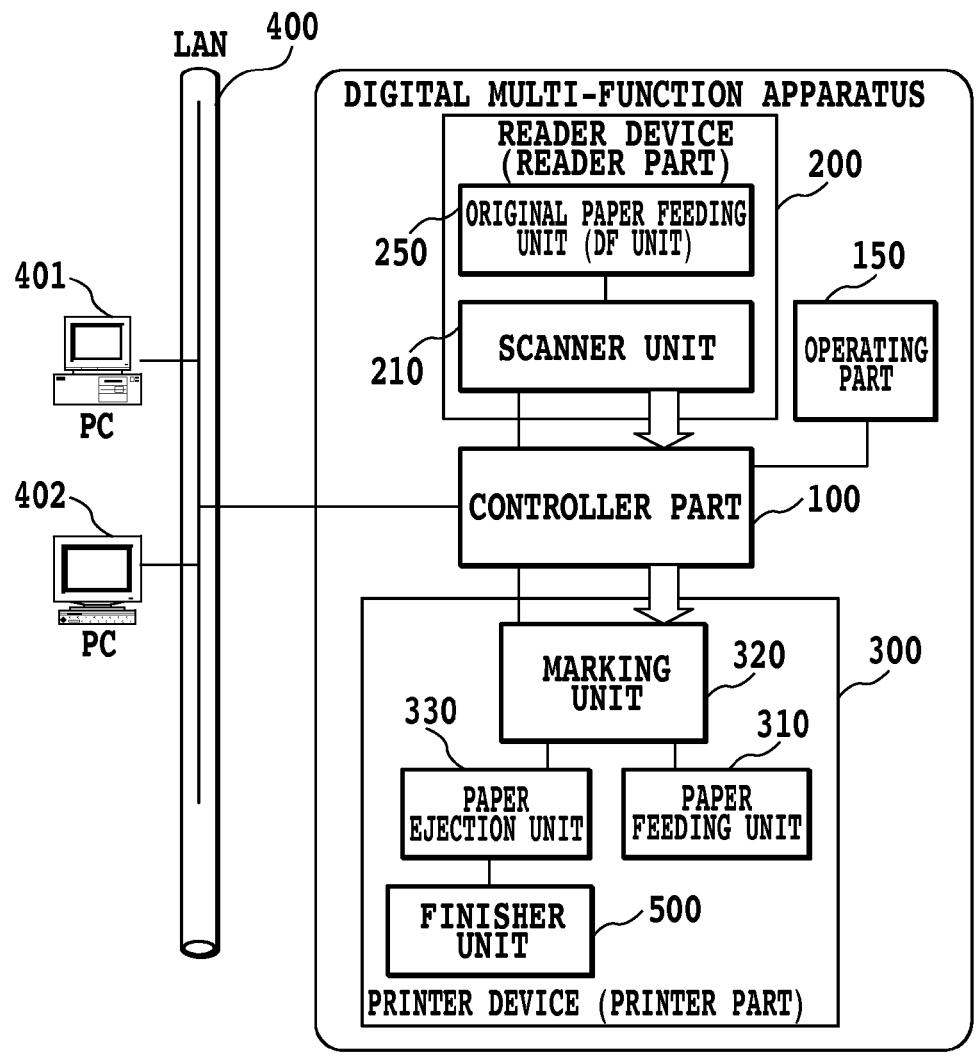
FIG. 1 is a diagram illustrating an exemplary system configuration in an embodiment.

FIG. 1 is a block diagram showing an overall configuration of a digital multi-function apparatus (example of a second information processor) that transmits/receives data to/from host computers 401, 402 (example of a first information processor) via a network 400.

A reader device (reader part) 200, which is an image input device, is a scanner and optically reads a copy image to convert it into image data. The reader device 200 includes a scanner unit 210 having a function to read copy and a original paper feeding unit 250 having a function to transport copy paper.

A printer (printer part) 300, which is an image output device, transports recording paper, prints image data as a visible image thereon, and ejects the recording paper outside the printer device 300.

The printer device 300 includes a paper feeding unit 310 having a plurality of types of recording paper cassettes and a marking unit 320 having a function to transfer and fix image data onto the recording paper. Further, the printer device 300 includes a paper ejection unit 330 having a function to output printed recording paper outside the printer device 300 and a finisher part 500 to perform staple processing and sort processing. A printer device is also called a printer engine.

A controller 100 is electrically connected to the reader device 200 and the printer device 300 and further connected to the host computers 401, 402 and various servers on the Internet via a network such as a LAN 400.

The controller 100 provides a copy function by controlling the reader device 200 to read image data of copy and controlling the printer device 300 to output the image data onto recording paper. The controller 100 also has a scanner function, printer function, box function, job control function, and decryption processing function. The scanner function is a function to convert image data read from the reader device 200 into code data to transmit it to a host computer via the LAN 400. The printer function is a function to convert print job data received from the host computer via the LAN 400 into image data to output it to the printer device 300. The box function is a function to store in a memory device in the controller 100 image data read by the reader device 200 or image data obtained from the print job data received from the host computer. The job control function is a function to control the received print job data. The decryption processing function is a function to decrypt encrypted print job data.

An operating part 150 is connected to the controller 100 and includes a liquid crystal touch-panel to provide a user interface for operating an image input/output system.

<Configuration of the Controller 100>

Figure 2:
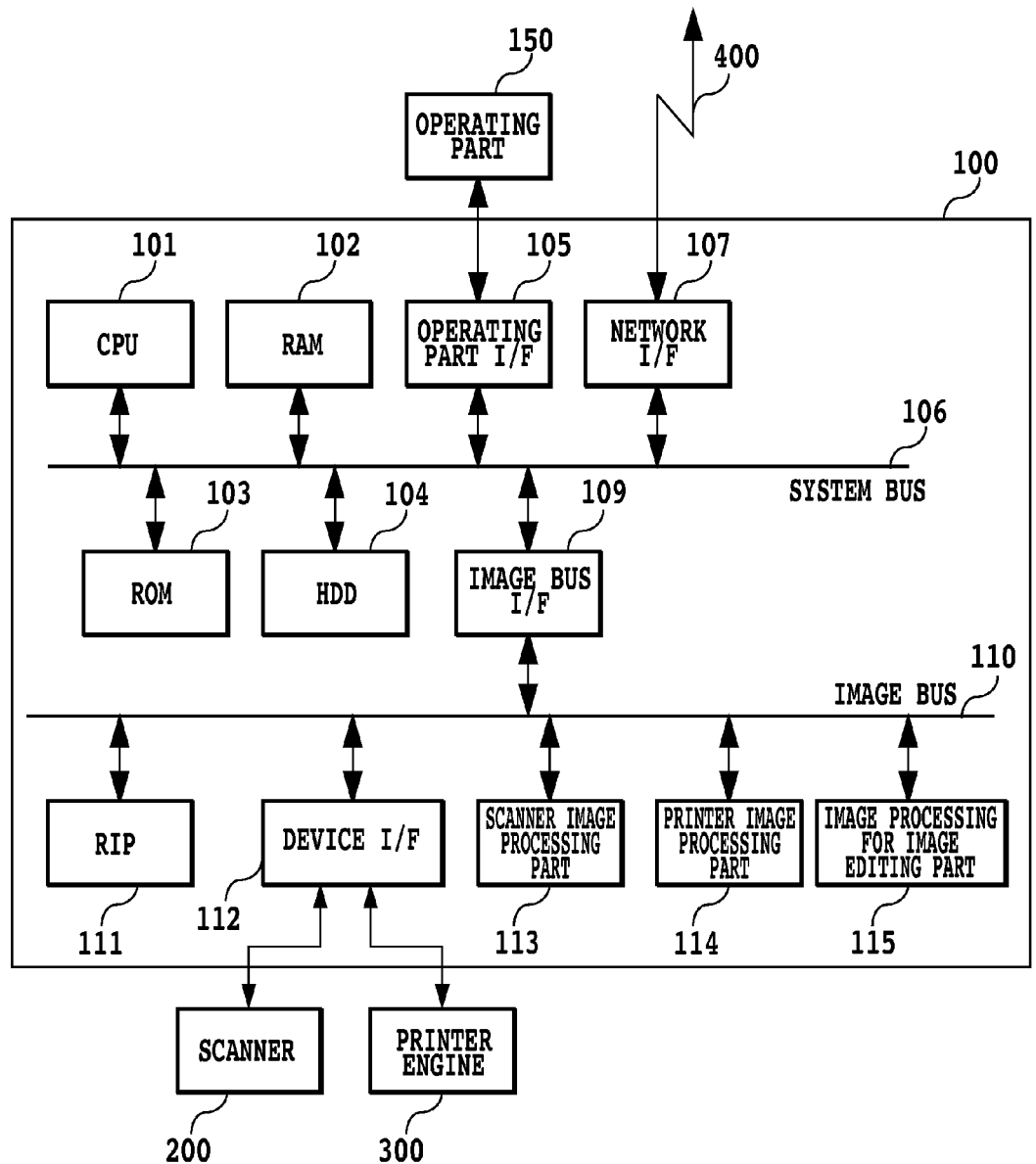
FIG. 2 is a block diagram illustrating an exemplary configuration of a controller of a device in an embodiment.

FIG. 2 is a block diagram illustrating an exemplary configuration of the controller 100 of a digital multi-function apparatus in the present embodiment.

In FIG. 2, the controller 100 is connected to the scanner 200, which is an image input device, and the printer engine 300, which is an image output device, to perform control for reading image data and print out. The controller 100 also performs control to input/output image information and device information via the LAN 400 with connection to the LAN 400.

A CPU 101 is a central processing unit for controlling an entire digital multi-function apparatus. A RAM 102 is a system work memory for operating the CPU 101 and is also a memory to temporarily store input document/image data. Further, a ROM 103 is a boot ROM and stores a system boot program therein and, at the same time, stores encryption key information that must not be known to third parties. An HDD 104 is a hard disk drive and stores controller software for various kinds of processing, input image data, user authentication information for security function, and encryption key information used temporarily. An operating part interface 105 is an interface part for the operating part 150 having a display screen that can display image data and the like and outputs operation screen data to the operating part 150. The operating part interface 105 also plays a role to transmit information input by a user from the operating part 150 to the CPU 101. A network interface 107 is realized, for example, by a LAN card and connected to the LAN 400 for input/output of information with external devices. The above units are connected to a system bus 106.

An image bus interface 109 is an interface to connect the system bus 106 and an image bus 110 that transfers image data at high speed and a bus bridge to convert the data structure. A raster image processor (RIP) 111, a device interface 112, a scanner image processing part 113, a printer image processing part 114, and an image processing for image editing part 115 are connected to the image bus 110.

The raster image processor (RIP) 111 expands page description language (PDL) code into images. The device interface 112 connects the scanner 200 and the printer engine 300 to the controller 100 to perform synchronous system/asynchronous system conversions of image data.

The scanner image processing part 113 performs various kinds of processing such as corrections, processing, and editing on image data input from the scanner 200. The printer image processing part 114 performs processing such as corrections and resolution conversions in accordance with the printer engine 300 on image data to be printed out. The image processing for image editing part 115 performs various kinds of image processing such as rotation of image data and compression/decompression processing of image data.

<Controller Software Configuration>

Figure 3:
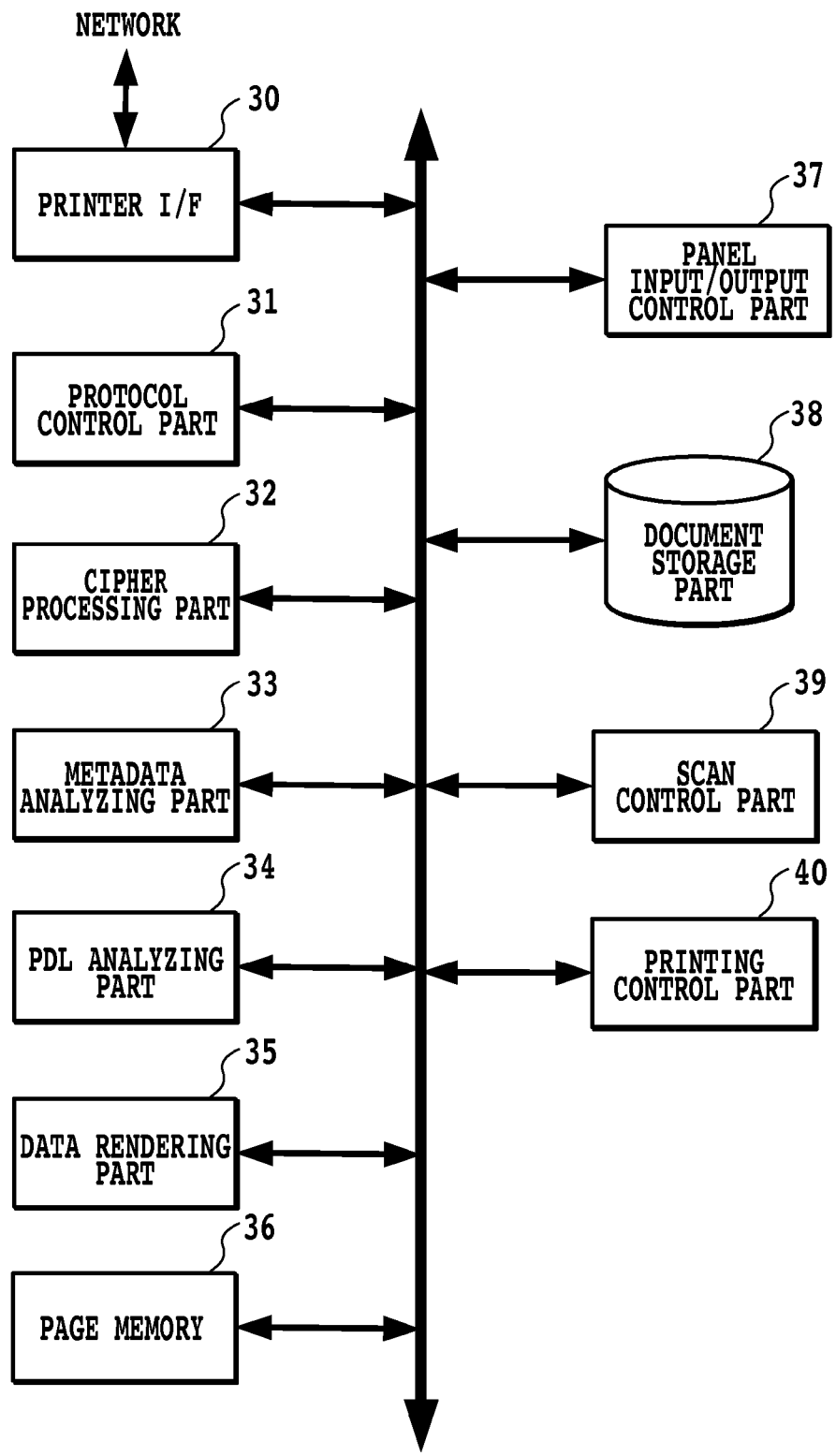
FIG. 3 is a block diagram illustrating an exemplary configuration of controller software in an embodiment.

FIG. 3 is a block diagram showing the configuration of controller software to control operations of a digital multi-function apparatus.

A printer interface 30 controls input/output with respect to external devices. A protocol control part 31 performs communication with external devices by analyzing and transmitting network protocols.

A cipher processing part 32 performs decryption processing according to a procedure described later if encrypted data is contained in electronic document data received by the protocol control part 31. The cipher processing part 32 also performs encryption processing according to a procedure described later when electronic document data containing encrypted data is to be transmitted to other devices.

A metadata analyzing part 33 reads print attributes attached to document/image data in electronic document data as metadata to store such print attributes as setting values for data control in devices.

A PDL analyzing part 34 analyzes PDL data received as document/image data to convert the PDL data into intermediate code (DisplayList, hereinafter, referred to as "DL") that is a format easier to process. Intermediate code generated by the PDL analyzing part 34 is delivered to a data rendering part 35 for processing. The data rendering part 35 expands the intermediate code into bitmap data and the expanded bitmap data is sequentially rendered into a page memory 36.

The page memory 36 is a volatile memory to temporarily hold bitmap data expanded by the data rendering part 35.

A panel input/output control part 37 controls input/output from/to the operating part 150.

A document storage part 38 stores a data file containing PDL data, DL, and metadata in units of job of electronic document data. This is realized, for example, by a secondary memory device such as a hard disk.

A scan control part 39 performs various kinds of processing such as corrections, converting, and editing on image data input from the scanner 200.

A printing control part 40 performs conversion processing of content of the page memory 36 into a video signal for image and transfer to the printer engine 300. The printer engine 300 is a printing mechanism part to form permanent visible images of the received video signal on a recording paper.

<Data Processing>

Next, how data is processed in a host computer and the controller of a digital multi-function apparatus will be described with reference to drawings.

Figure 4:
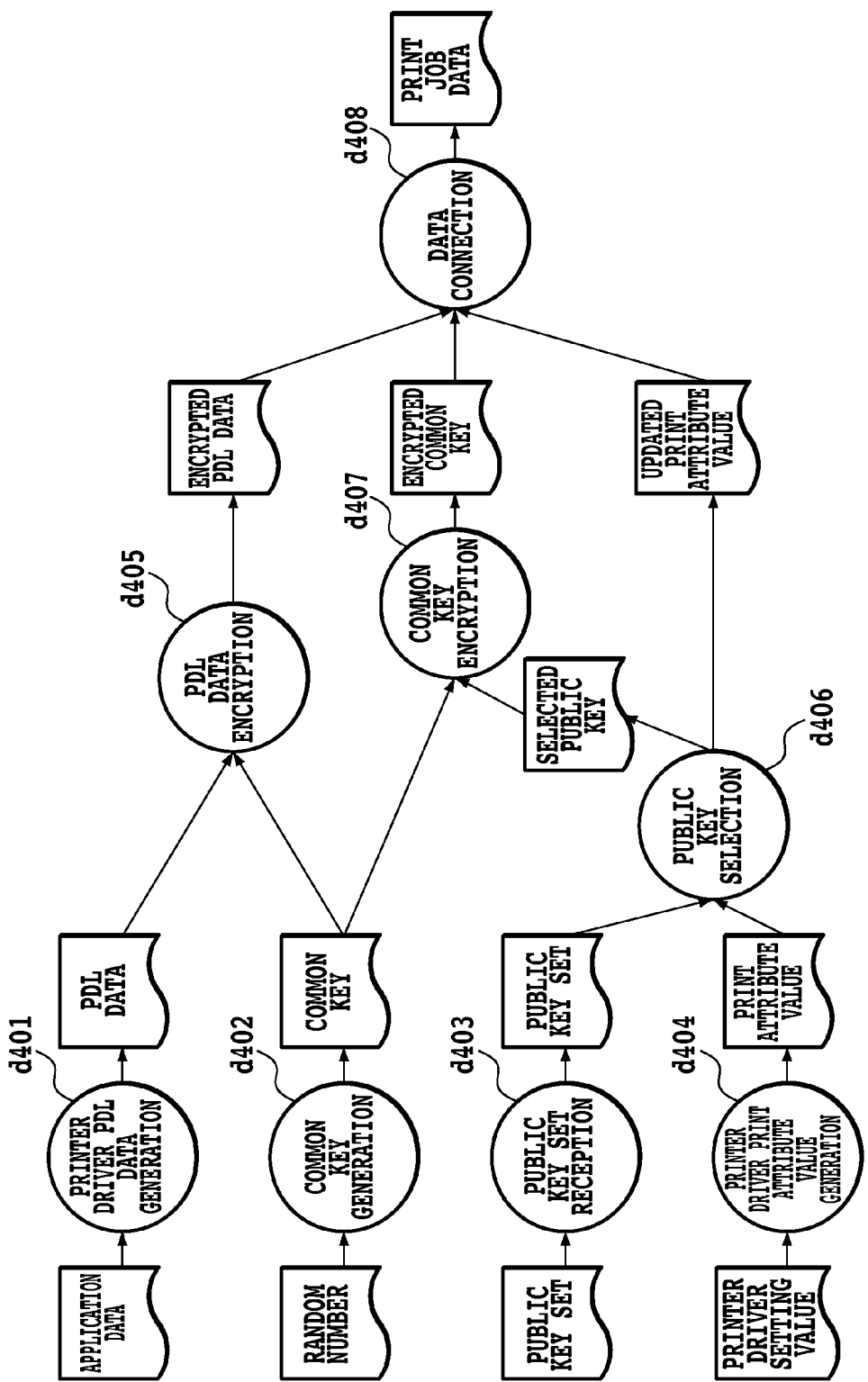
FIG. 4 is a diagram illustrating a data flow on a host computer in an embodiment.
Figure 6:
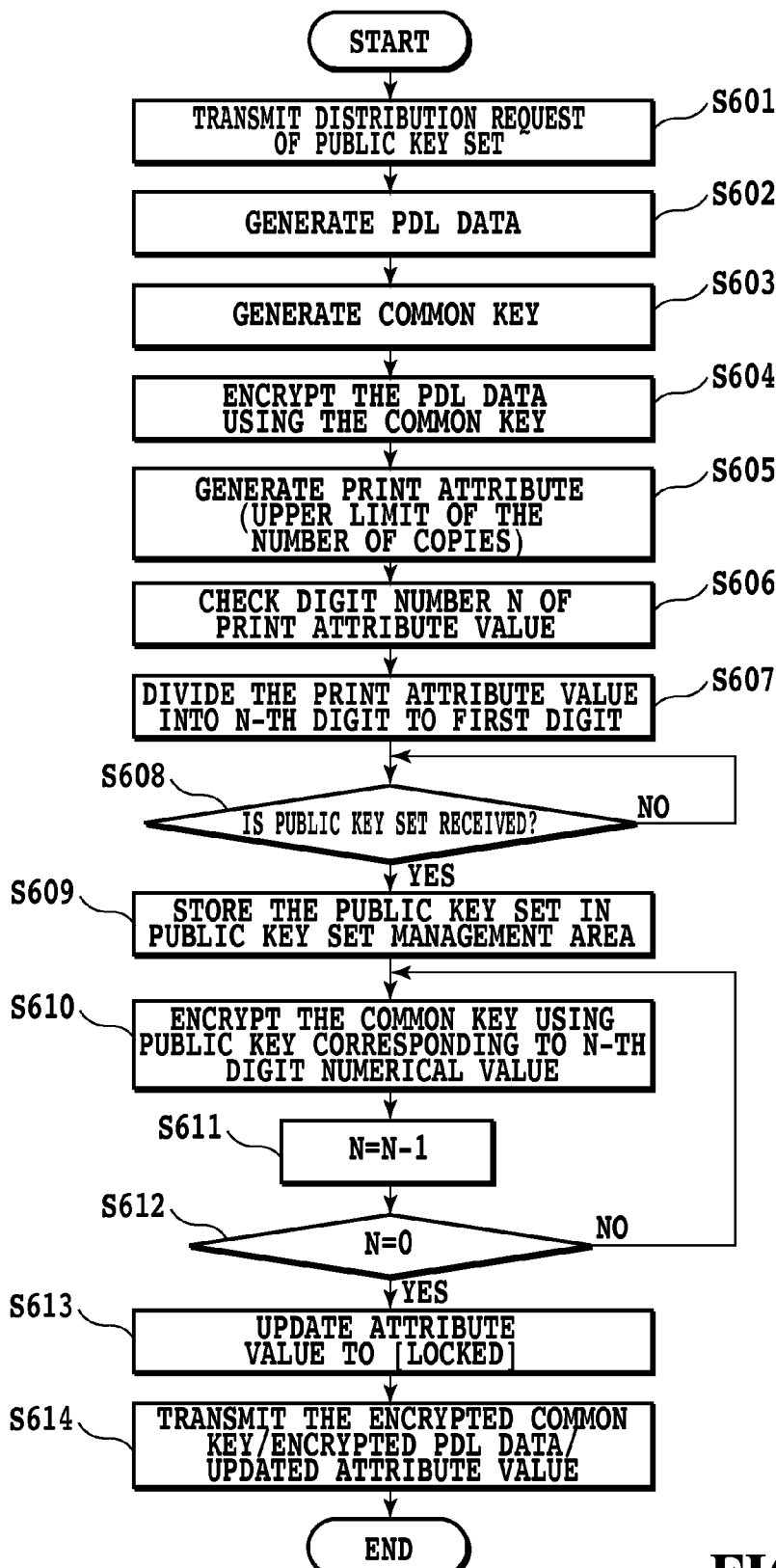
FIG. 6 is a diagram illustrating a flow of processing on the host computer in a first embodiment.
Figure 9:
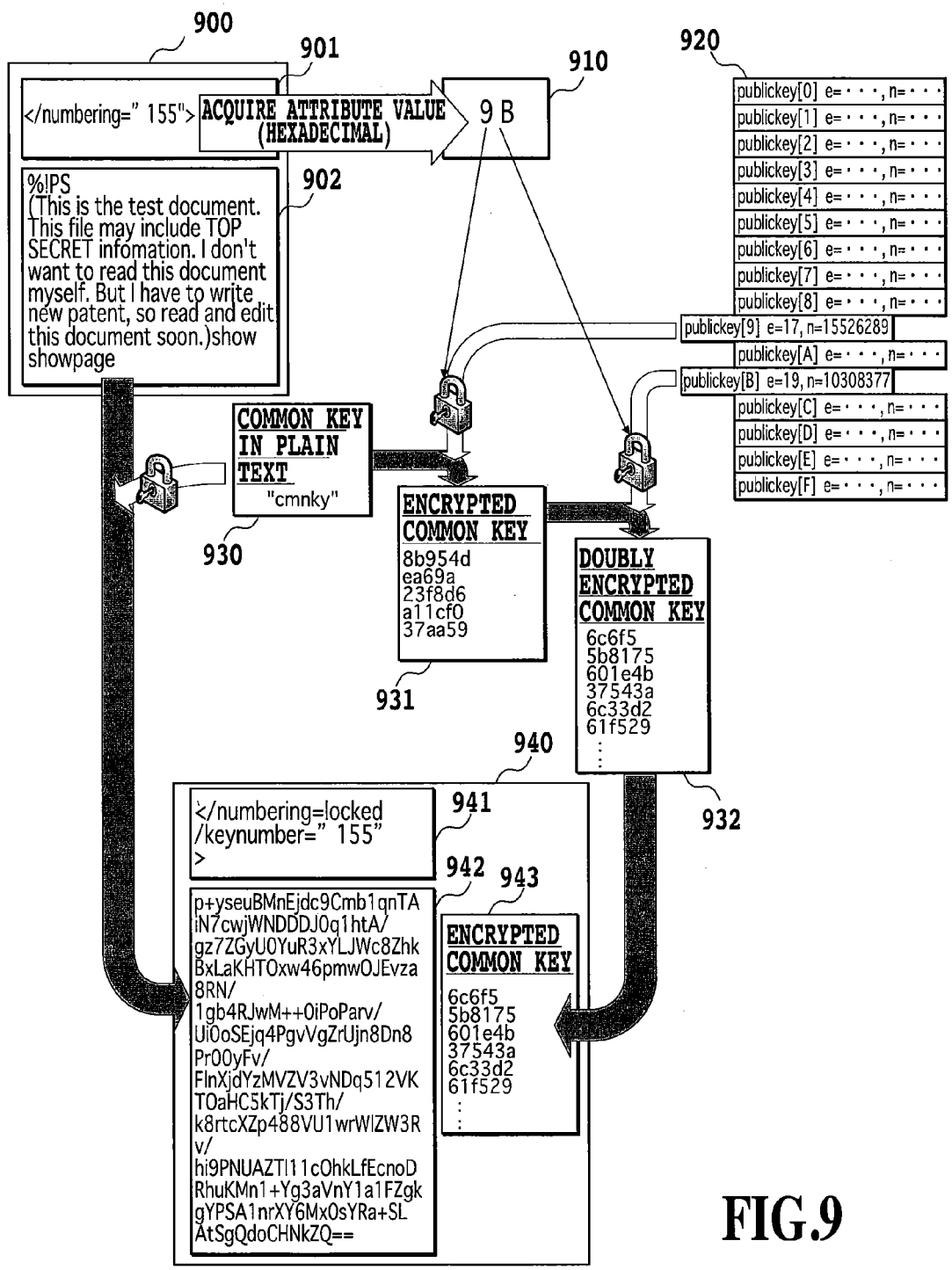
FIG. 9 is a diagram schematically illustrating print job data encryption processing on the host computer in the first embodiment.

FIG. 4 is an example of data flow executed by the host computer 401 according to the present embodiment. FIG. 6 is an exemplary flow chart showing the flow of processing executed by the host computer 401 according to the present embodiment. FIG. 9 is a schematic diagram exemplarily illustrating data encryption processing performed by the host computer 401 according to the present embodiment.

On the host computer 401, application software such as a word processor, spreadsheet software, and a Web browser is running. Data handled by application software is called application data. A printer driver running on the host computer 401 performs processing d401 to convert application data into PDL data to generate the PDL data. The PDL data generated here includes character object data defined by character code and font data, graphics object data defining line drawing and area filling, and image object data consisting of bitmaps. In addition to the above object data, PDL data may also contain variables or procedures as a programming language. The printer driver also performs processing d404 for generating a device control command to instruct operations of the digital multi-function apparatus and a control command regarding security of print jobs, and generates print attributes attached to the PDL data.

Further, on the host computer 401, a program to perform processing for encryption is also running. Generation of print job data and encryption processing thereof executed by the host computer 401 in the present embodiment will be described below.

First, the host computer 401 transmits a distribution request of a public key set to the controller 100 of a digital multi-function apparatus at step S601. The host computer 401 performs the PDL data generation processing d401 to obtain PDL data 902 at step S602. Subsequently at step S603, the host computer 401 performs common key generation processing d402 to obtain a common key 930. From the viewpoint of difficulty of cryptanalysis, the common key 930 is preferably generated using random numbers. The host computer 401 performs encryption processing d405 of the PDL data at step S604. In the present embodiment, the host computer 401 performs DES (Data Encryption Standard) encryption on the PDL data 902 in plain text using the common key 930 to obtain encrypted PDL data 942. A printer driver of the host computer 401 performs the print attribute generation processing d404 at step S605. Here, a print attribute 901 concerning the upper limit of the number of print copies (upper limit of the number of copies) set for the printer driver is generated. The digital multi-function apparatus having a box function provides a function to print out print job data stored in the box by changing its print attributes. The number of print copies of printed matter can also be changed. However, if there is a possibility of problems such as printing costs and confidential information control arising from unlimited printing (copies), it may turn out to be effective to specify the upper limit of the number of print copies in advance. By setting the print attribute 901 regarding the upper limit of print copies, printout using the print job data is made incapable of printing print copies exceeding the preset number of print copies.

Subsequently, the technique used by the host computer 401 to encrypt the common key 930 using the print attribute 901 will be described. In public key selection processing d406, the host computer 401 first converts the upper limit of the number of print copies "155" of the print attribute 901 into a combination of numbers or characters at step S606 and step 5607. For example, the host computer 401 converts the upper limit of the number of print copies "155" into a numerical value 910 in hexadecimal notation "9B". Next, the host computer 401 decomposes "9B" into numerical values "9" and "B" in each digit and, at the same time, memorizes that "9B" is a "2-digit" hexadecimal number. Subsequently, the host computer 401 prepares a public key set used for encryption of the common key. Since the host computer 401 has transmitted a distribution request of a public key to the controller 100 of the digital multi-function apparatus at step 5601, the host computer 401 checks reception thereof by public key set reception processing d403 at step 5608. If no public key set has been received, the host computer 401 returns to step S608 again to wait until reception is completed. After reception is completed, the host computer 401 stores the received public key set in a public key set management area at step S609. In the present embodiment, a public key set 920 including 16 different public keys to which identification numbers ranging from "0" to "F" are attached is stored. Each public key is a key to be used for RSA encryption and 16 different secret keys to which identification numbers ranging from "0" to "F" are attached exist in the controller 100, creating key pairs of a public key and a secret key of the same identification number. At step S610, the host computer 401 selects the public key to which the identification number corresponding to the second digit "9" obtained by decomposing the hexadecimal notation number of the upper limit of print copies is attached from within the public key set 920. Further, the host computer 401 performs RSA encryption of the common key 930 using the public key corresponding to the public key number "9" by processing d407 to obtain an encrypted common key 931. Next at step S611, after encryption processing using the public key corresponding to the numerical value in the second digit of the print attribute being completed, the host computer 401 knows that the public key to be used next for encryption processing is the public key corresponding to the numerical value in the (2-1)-th digit of the print attribute. Further, at step S612, the host computer 401 checks whether or not processing of public key encryption using numerical values of all digits has been completed. Here, since a digit not yet used for public key encryption remains, the host computer 401 performs encryption processing using the numerical value "B" in the first digit of the print attribute again at step S610. The host computer 401 selects the public key to which the identification number corresponding to "B" is attached from within the public key set 920. Further, the host computer 401 performs RSA encryption of the already encrypted common key 931 using the public key corresponding to the public key number "B" by the processing d407 to obtain a doubly-encrypted common key 932. At step S611, the host computer 401 knows that the identification number of public key to be used next for encryption processing is the one in the (1-1)-th digit of the print attribute. When completion of processing for all digits is confirmed at step S612, the host computer 401 updates the print attribute to a print attribute 941 indicating that encryption processing of the print job data has been performed based on the print attribute 901 at step S613. The print attribute representing the upper limit of the number of print copies is updated to a character string "locked" and further, a print attribute "Neynumber" is added. The numerical value "155", which was originally set as the upper limit of print copies, is written to "/keynumber" in plain text.

Lastly, the host computer 401 performs data connecting processing d408 at step S614. With this processing, the host computer 401 connects the print attribute 941, the encrypted PDL data 942, and a print 943 of the common key 932 subjected to multiple encryption (doubly-encrypted in the above example) to obtain print job data 940.

Figure 5:
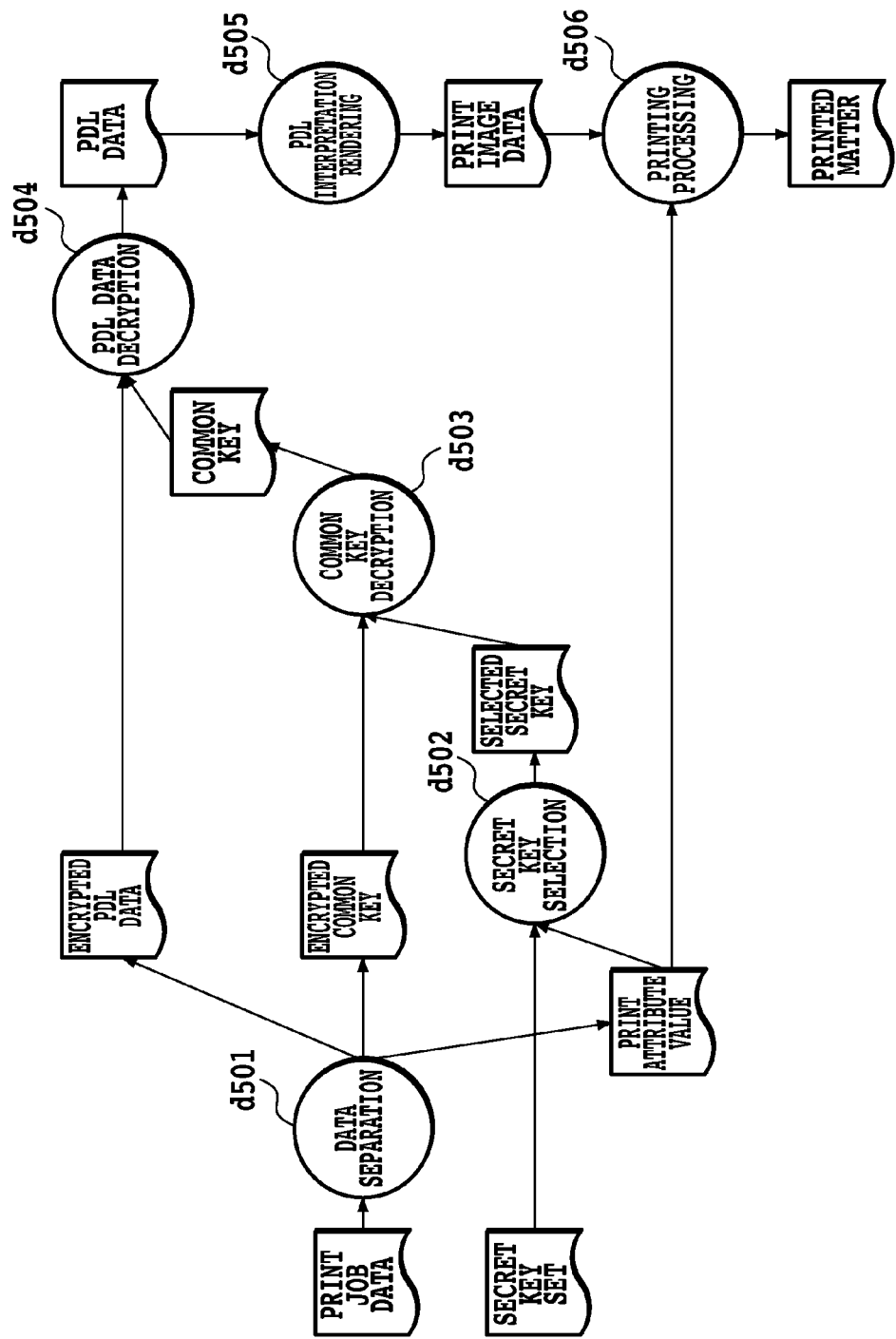
FIG. 5 is a diagram illustrating a data flow in the controller in an embodiment.
Figure 7:
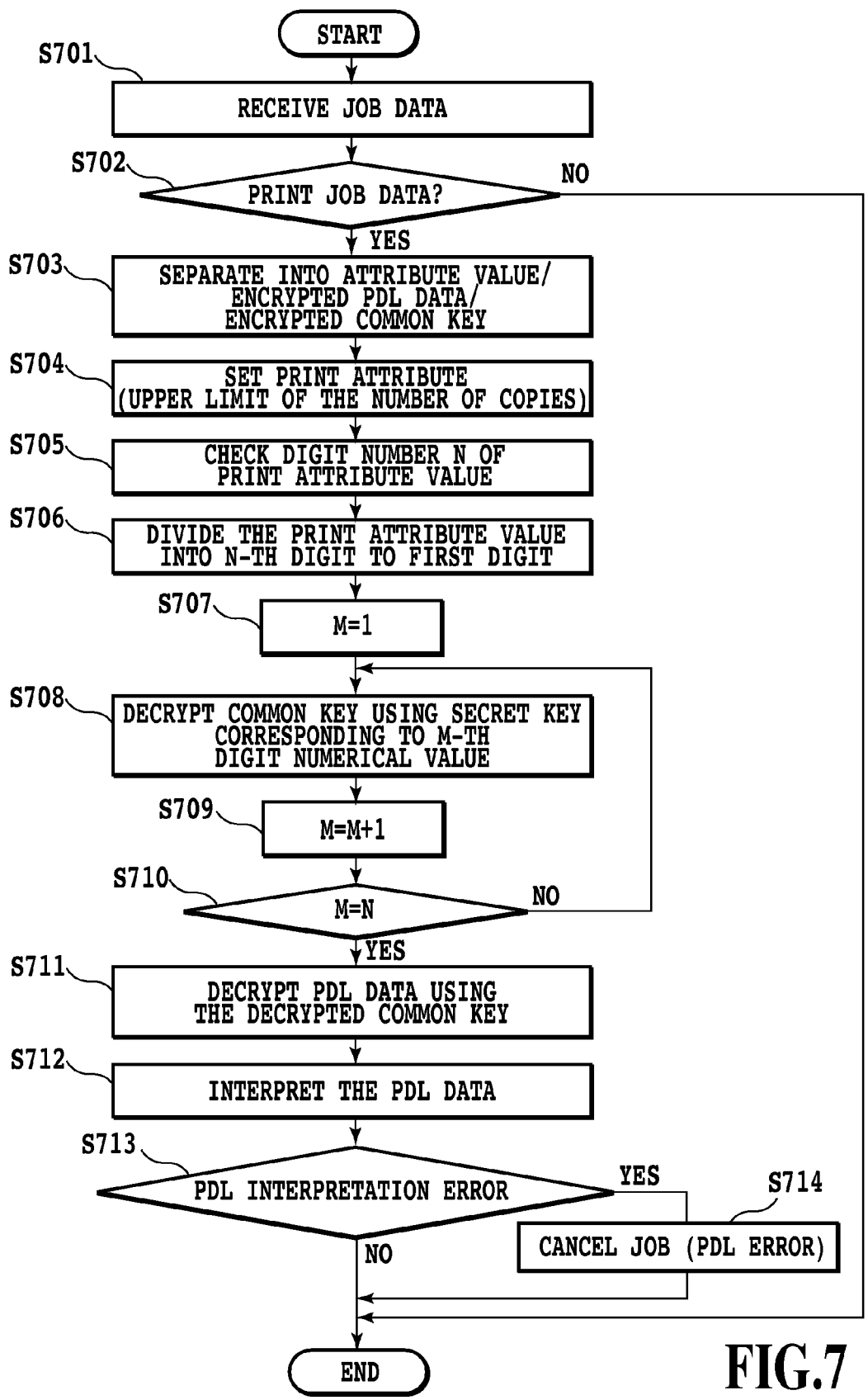
FIG. 7 is a diagram illustrating a flow of print job processing in the controller in the first embodiment.
Figure 8:
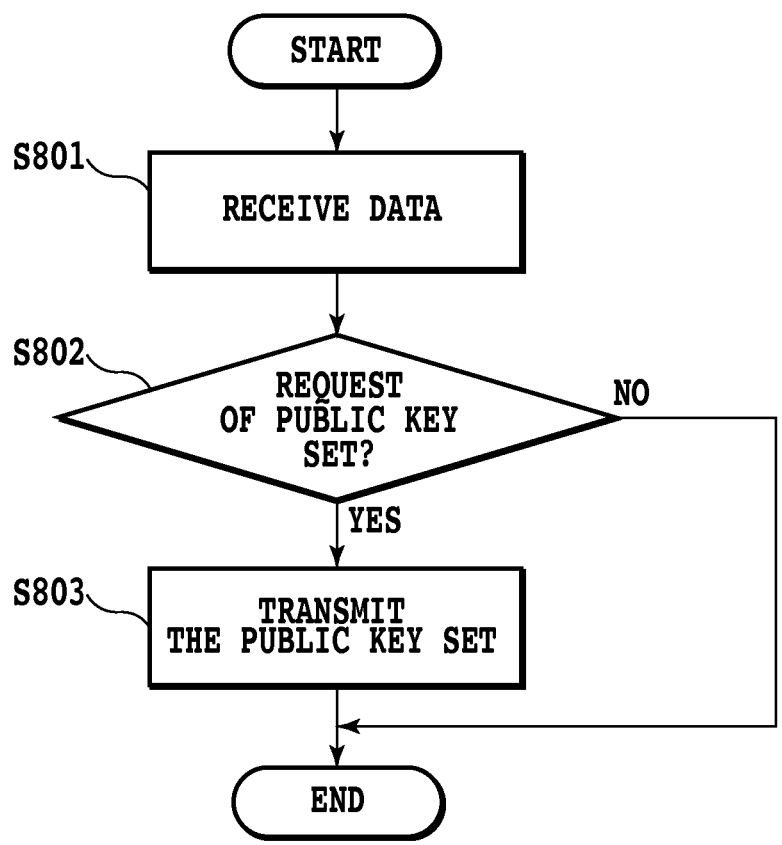
FIG. 8 is a diagram illustrating a flow of public key distribution processing in the controller in the first embodiment.
Figure 10:
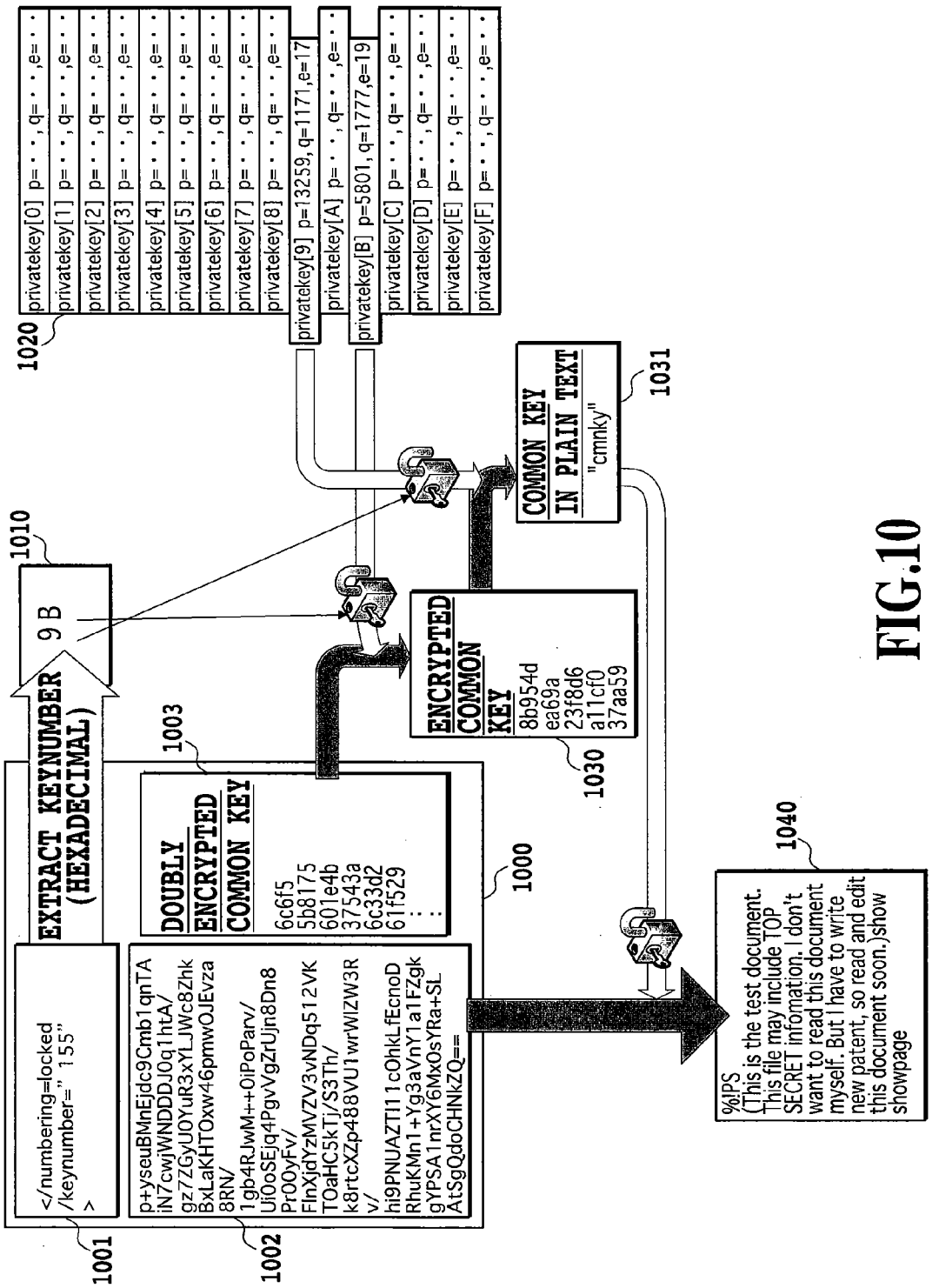
FIG. 10 is a diagram schematically illustrating print job data decryption processing in the controller in the first embodiment.

FIG. 5 is an example of data flow executed by the controller 100 according to the present embodiment. FIG. 7 and FIG. 8 are exemplary flow charts showing the flow of processing executed by the controller 100 according to the present embodiment. FIG. 10 is a schematic diagram exemplarily illustrating data decryption processing executed by the controller 100 according to the present embodiment.

In order to generate job data, the host computer 401 transmits a distribution request of a public key set at step S601. After receiving data at step S801, the controller 100 determines whether or not the data is a distribution request of a public key set at step S802. If the data is a distribution request of a public key set, the controller 100 transmits the public key set stored in the built-in ROM 103 to the host computer 401 at step S803. The host computer 401 uses the public key set to encrypt print job data and transmits the encrypted print job data to the controller 100.

The controller 100 receives the data transmitted by the host computer 401 at step S701. The controller 100 determines whether or not the received data is print job data at step S702. If the received data is print job data, the controller 100 performs data separation processing d501. The controller 100 separates the print job data into a print attribute 1001, encrypted PDL data 1002, and an encrypted common key 1003 at step S703. The print attribute 1001 is "/copieslimit" specifying the upper limit of print copies and has "locked" indicating "encrypted" attached to the value thereof. Thus, the controller 100 makes a print attribute setting (upper limit of print copies) at step S704 so as to use "155" indicated by /keynumber="155" as the actual upper limit of print copies.

Subsequently, the controller 100 obtains the hexadecimal notation "9B" for /keynumber="155" at steps S705 and S706 in secret key selection processing d502. At this stage, it is clear that there are two secret keys necessary for decrypting the common key 1003 received in an encrypted state and these secret keys are "9" and "B" in order of being used for encryption. The controller 100 sets a counter M used for secret key selection to one at step S707. At step S708, the controller 100 selects the secret key corresponding to "B" in the lower M-th digit (=lower first digit) from within a secret key set 1020 and decrypts the doubly-encrypted common key once by common key decryption processing d503 to obtain a common key 1030. Subsequently, the controller 100 increments the secret key selection counter M to set M=2 at step S709. Since the value of M does not exceed two, which is the number of secret keys, at step S710, the controller 100 returns to step S708 to select the secret key corresponding to "9" in the lower second digit and decrypts the encrypted common key to obtain a common key 1031 in plain text. Then, M is incremented to M=3 at step S709. Since M=3 exceeds two, which is the number of secret keys, the controller 100 terminates common key decryption processing at step S710.

Now that the common key being decrypted, the controller 100 decrypts the encrypted PDL data 1002 using the common key 1031 in plain text by processing S504 to obtain PDL data 1040 in plain text at step S711.

Subsequently, the controller 100 interprets the PDL data by PDL interpretation rendering processing d505 at step S712. If decryption of the PDL data has failed, the controller 100 detects a PDL syntax error at step S713 to issue a PDL error at step S714 or to print out a PDL error by printing processing d506, which could result in distorted content of printing.

DES is used as the common key encryption algorithm and RSA is used as the public key encryption algorithm in the above description of the present embodiment. However, these algorithms need not be necessarily used to embody the present invention. Many algorithms satisfying requirements of each of the common key encryption and public key encryption exist and therefore, algorithms may be selected and applied appropriately in accordance with needed cryptographic strength and costs.

<Print Job Data Structure>

Figure 15:
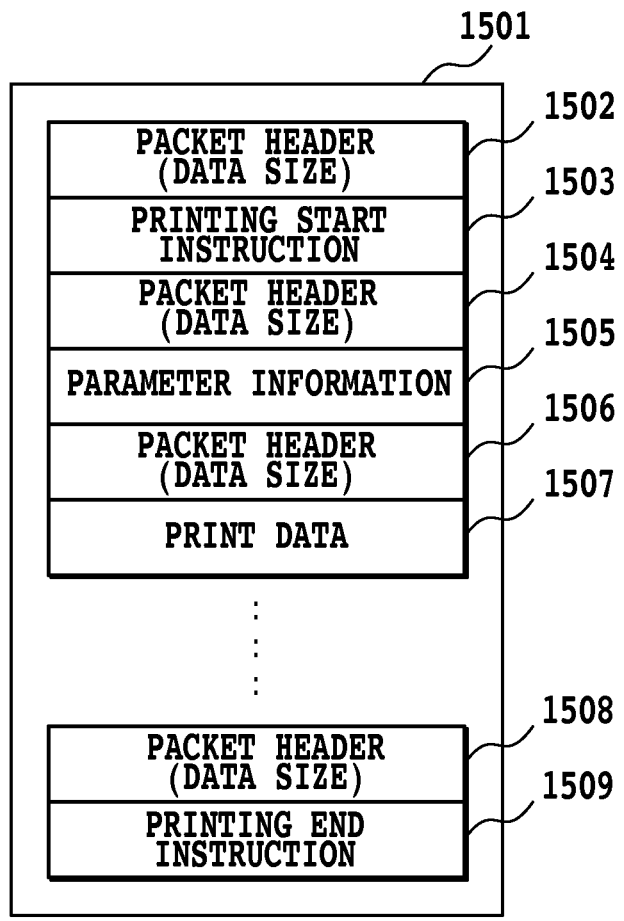
FIG. 15 is a diagram illustrating a data structure of a document in the first embodiment.

Next, the data structure of print job data will be described using FIG. 15.

Reference numeral 1501 represents print job data consisting of a series of commands for one piece of printing processing.

Reference numeral 1502 is a packet header of a command 1503 and the data size of the command 1503 is stored in the header. Reference numeral 1503 is a command (printing start instruction) to indicate the start of a job and data managed as a job ranges from the command to an end command (printing end instruction) 1509.

Reference numeral 1504 is a packet header of a command 1505 and the data size of the command 1505 is stored in the header. Reference numeral 1505 is a setting command of print attributes and a command (parameter information) indicating setting data.

Reference numeral 1506 is a packet header of a command 1507 and the data size of the command 1507 is stored in the header. Reference numeral 1507 is print data (PDL data) to be actually printed.

Reference numeral 1508 is a packet header of a command 1509 and the data size of the command 1509 is stored in the header. Reference numeral 1509 is a job end command, which is paired with the job start command 1503 to identify job information.

Incidentally, each packet header of the reference numerals 1502, 1504, 1506, and 1508 may store information other than the data size of a command, that is, packet identification data and information other than the data size of a command is not specifically limited. Not only a single piece of information, but also a plurality of types of information may be stored in the packet header. For example, the data size and identification data indicating whether the data is a print attribute or document/image data to be printed may be stored in the packet header.

The print job data 1501 is transmitted and received as a chunk of a packet header and parameters in units of packets.

The packet here is not a packet of low layer as a packet used in data communication in a network, but a generic concept as a chunk of data.

Information enclosed by the job start command 1503 and the job end command 1509 is handled as one print job unit.

In the above print job data structure, the print attribute 941 is described in the parameter information 1505. The print data 1507 corresponds to the encrypted PDL data 942. The encrypted common key 943 is also described in the print data 1507. When the above structure is adopted, the upper limit of print copies indicated by the print attribute 941 will be applied to all pages contained in a print job. Thus, the same common key will be used for document/image data in all pages.

[Second Embodiment]

In the first embodiment, a mode in which the print attribute is a numerical value is described. In the second embodiment, a mode in which the print attribute is a character string will be described with reference to drawings.

<Data Processing>

Figure 11:
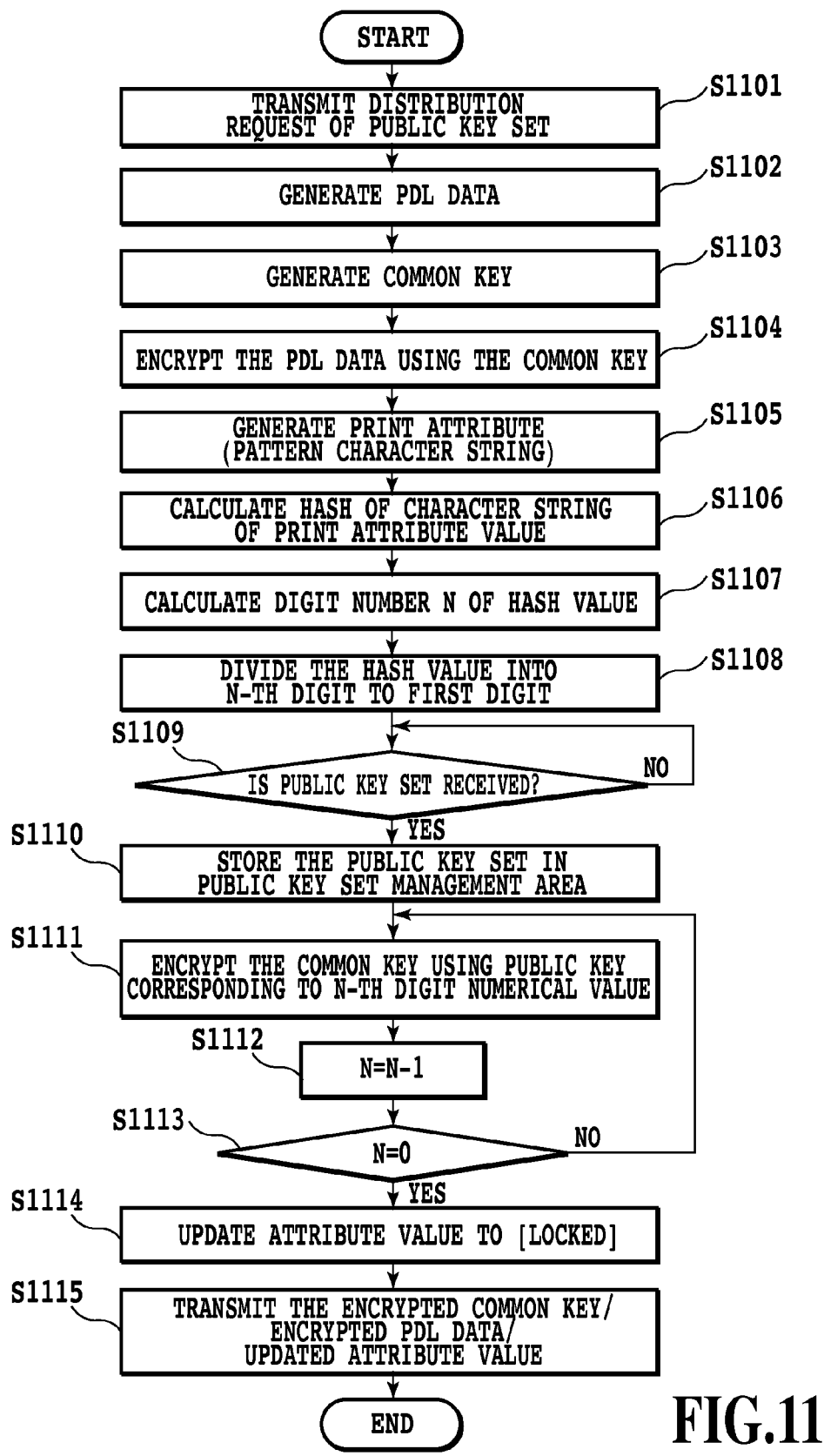
FIG. 11 is a diagram illustrating a flow of processing on the host computer in a second embodiment.
Figure 13:
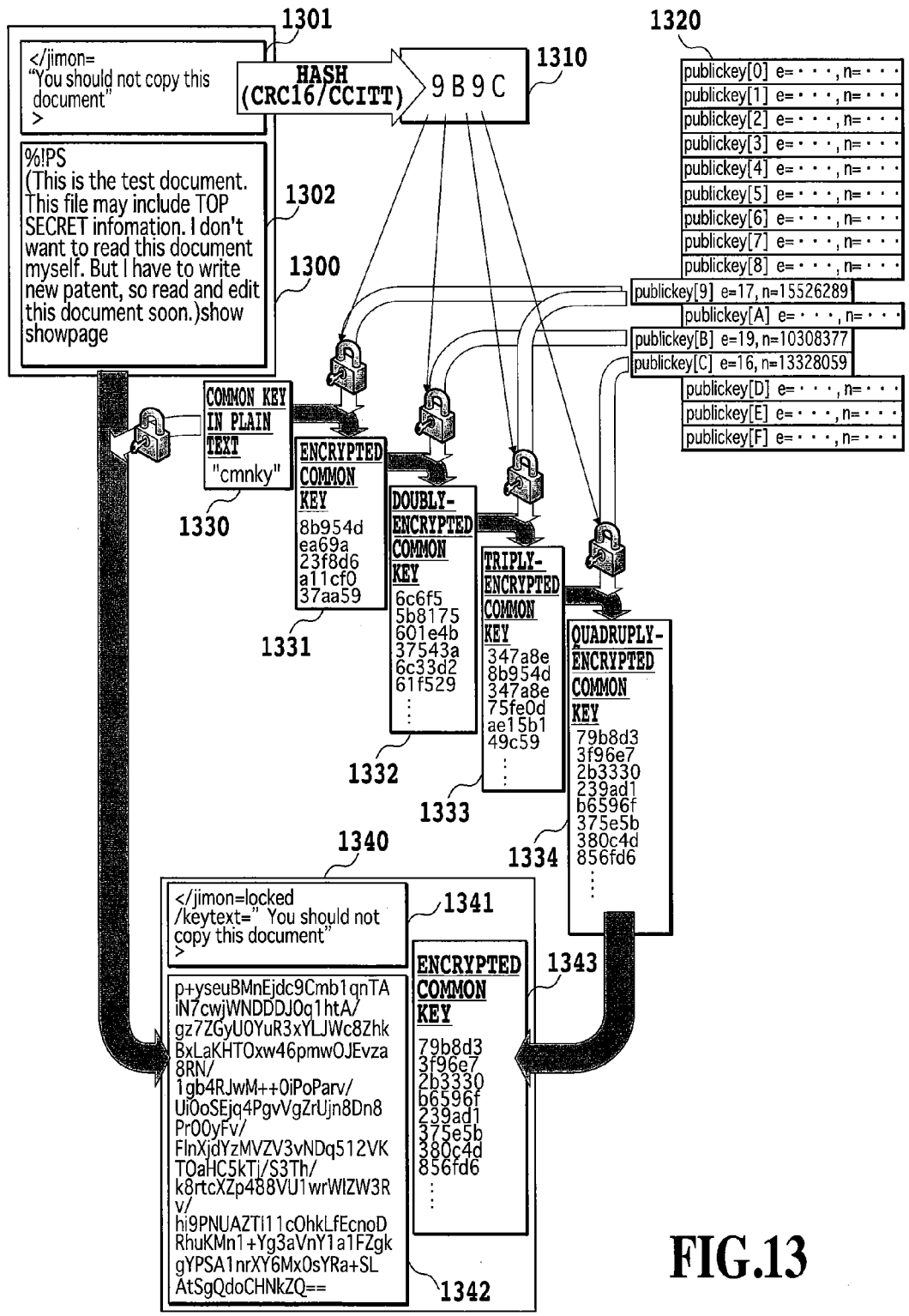
FIG. 13 is a diagram schematically illustrating print job data encryption processing on the host computer in the second embodiment.

FIG. 11 is an example of flow chart showing the flow of processing performed by the host computer 401 in the present embodiment. FIG. 13 is a diagram exemplarily showing data encryption processing performed by the host computer 401 in the present embodiment.

First, the host computer 401 transmits a distribution request of a public key set to the controller 100 of a digital multi-function apparatus at step S1101. The host computer 401 performs the PDL data generation processing d401 to obtain PDL data 1302 at step S1102. Subsequently at step S1103, the host computer 401 performs the common key generation processing d402 to obtain a common key 1330. From the viewpoint of difficulty of cryptanalysis, the common key 1330 is preferably generated using random numbers. The host computer 401 performs the encryption processing d405 of the PDL data at step S1104. In the present embodiment, the host computer 401 performs DES (Data Encryption Standard) encryption on the PDL data 1302 in plain text using the common key 1330 to obtain encrypted PDL data 1342. A printer driver of the host computer 401 performs the print attribute generation processing d404 at step S1105. Here, a print attribute 1301 concerning a pattern character string (i.e. a character string used for a copy forgery inhibited pattern image) set to the print driver. The print attribute 1301 is represented as a character string. The pattern character string is to be added by a user who generates a job by the printer driver, and the character string is converted by the controller 100 into a character pattern image and further embedded as a latent image pattern by a combination of density and dot diameter. If an output to which a pattern (i.e. a copy forgery inhibited pattern) is added is scanned by an optical scanner, a pattern embedded as a latent image by a combination of density and dot diameter stands out sharply. Optical copies of printout matter can thereby be limited.

Subsequently, the technique used by the host computer 401 to encrypt the common key 1330 using the print attribute 1301 will be described. In the public key selection processing d406, the host computer 401 first calculates a hash value 1310 for the print attribute 1301 at step S1106. At step S1107, the host computer 401 decomposes the hash value "9B9C" into "9", "B", "9", and "C" in each digit and, at the same time, memorizes that the hash value is a "4-digit" hexadecimal number.

Subsequently, the host computer 401 prepares a public key set used for encryption of the common key. Since the host computer 401 has transmitted a distribution request of a public key set to the controller 100 of the digital multi-function apparatus at step S1101, the host computer 401 checks reception thereof by the public key set reception processing d403 at step S1109. If no public key set has been received, the host computer 401 returns to step S 1101 again to wait until reception is completed. After reception is completed, the host computer 401 stores the received public key set in the public key set management area at step S 1110. In the present embodiment, a public key set 1320 including 16 different public keys to which identification numbers ranging from "0" to "F" are attached is stored. Each public key is a key to be used for RSA encryption and 16 different secret keys to which identification numbers ranging from "0" to "F" are attached exist in the controller 100, creating key pairs of a public key and a secret key of the same identification number. The host computer 401 selects the public key to which the identification number corresponding to the fourth digit "9" obtained by decomposing the hash value from within the public key set 1320 at step S1111. Further, the host computer 401 performs RSA encryption of the common key 1330 using the public key corresponding to the public key number "9" by the processing d407 to obtain an encrypted common key 1331. Next at step S1112, after encryption processing using the public key corresponding to the numerical value in the fourth digit of the print attribute being completed, the host computer 401 knows that the public key to be used next for encryption processing is the public key corresponding to the numerical value in the (4-1)-th digit of the print attribute. Further, the host computer 401 checks whether or not processing of public key encryption using numerical values of all digits has been completed at step S1113. Here, since digits not yet used for public key encryption remain, the host computer 401 performs encryption processing using the numerical value "B" in the third digit of the print attribute again at step S 1111. The host computer 401 selects the public key to which the identification number corresponding to "B" is attached from within the public key set 1320. Further, the host computer 401 performs RSA encryption of the already encrypted common key 1331 using the public key corresponding to the public key number "B" by the processing d407 to obtain a doubly-encrypted common key 1332. The host computer 401 performs the processing loop for all digits. When completion of processing for all digits is confirmed at step S1113, the host computer 401 updates the print attribute to a print attribute 1341 indicating that encryption processing of the print job data has been performed based on the print attribute 1301 at step S1114. The print attribute representing the pattern character string is updated to a character string "locked" and further, a print attribute "/keytext" is added. The character string that was originally set as a pattern character string is written to "/keytext" in plain text.

Lastly, the host computer 401 performs the data connecting processing d408 at step S1115. With this processing, the host computer 401 connects the print attribute 1341, the encrypted PDL data 1342, and a copy 1343 of a quadruply-encrypted common key 1334 to obtain print job data 1340.

Figure 12:
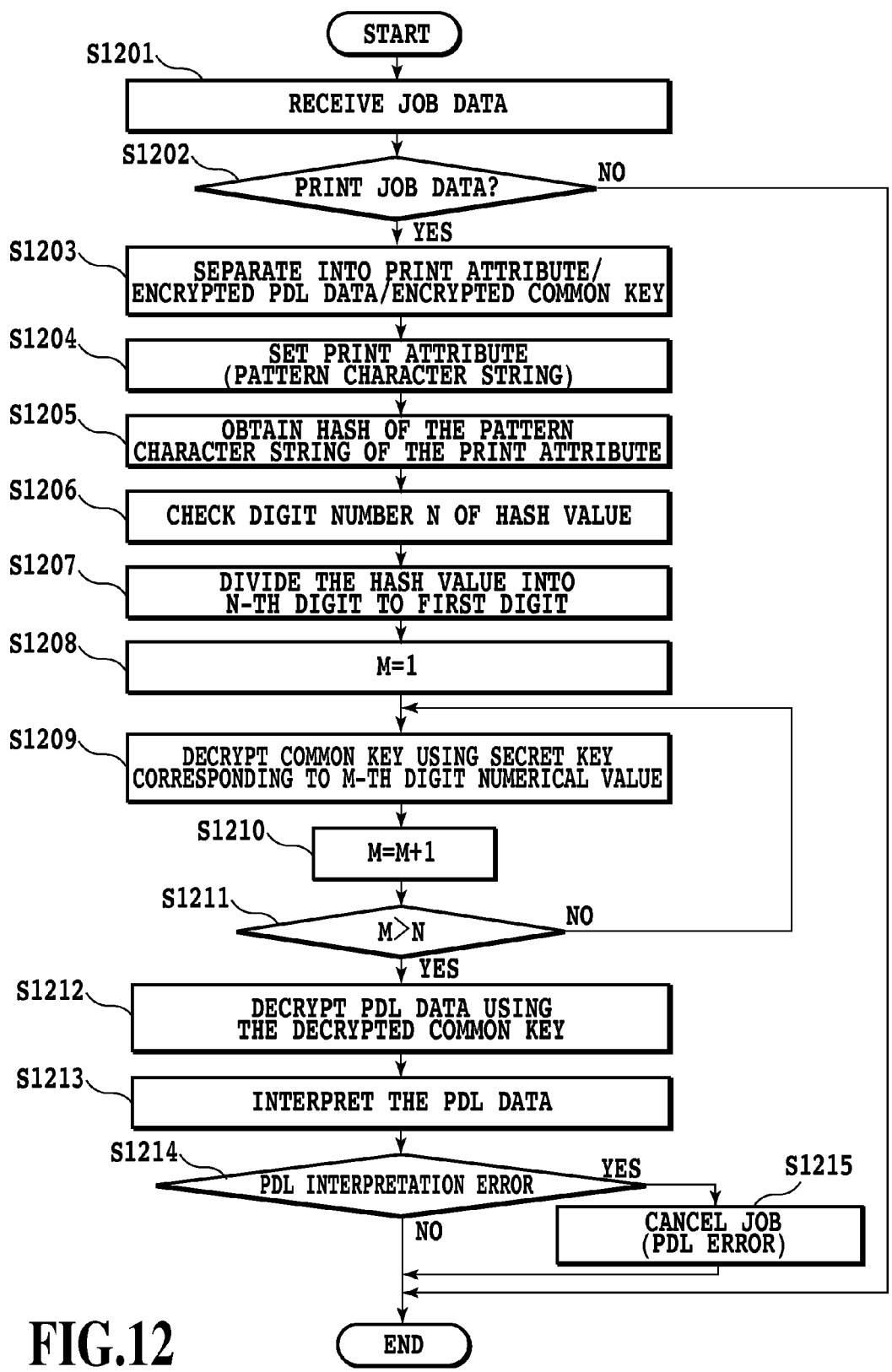
FIG. 12 is a diagram illustrating a flow of print job processing in the controller in the second embodiment.
Figure 14:
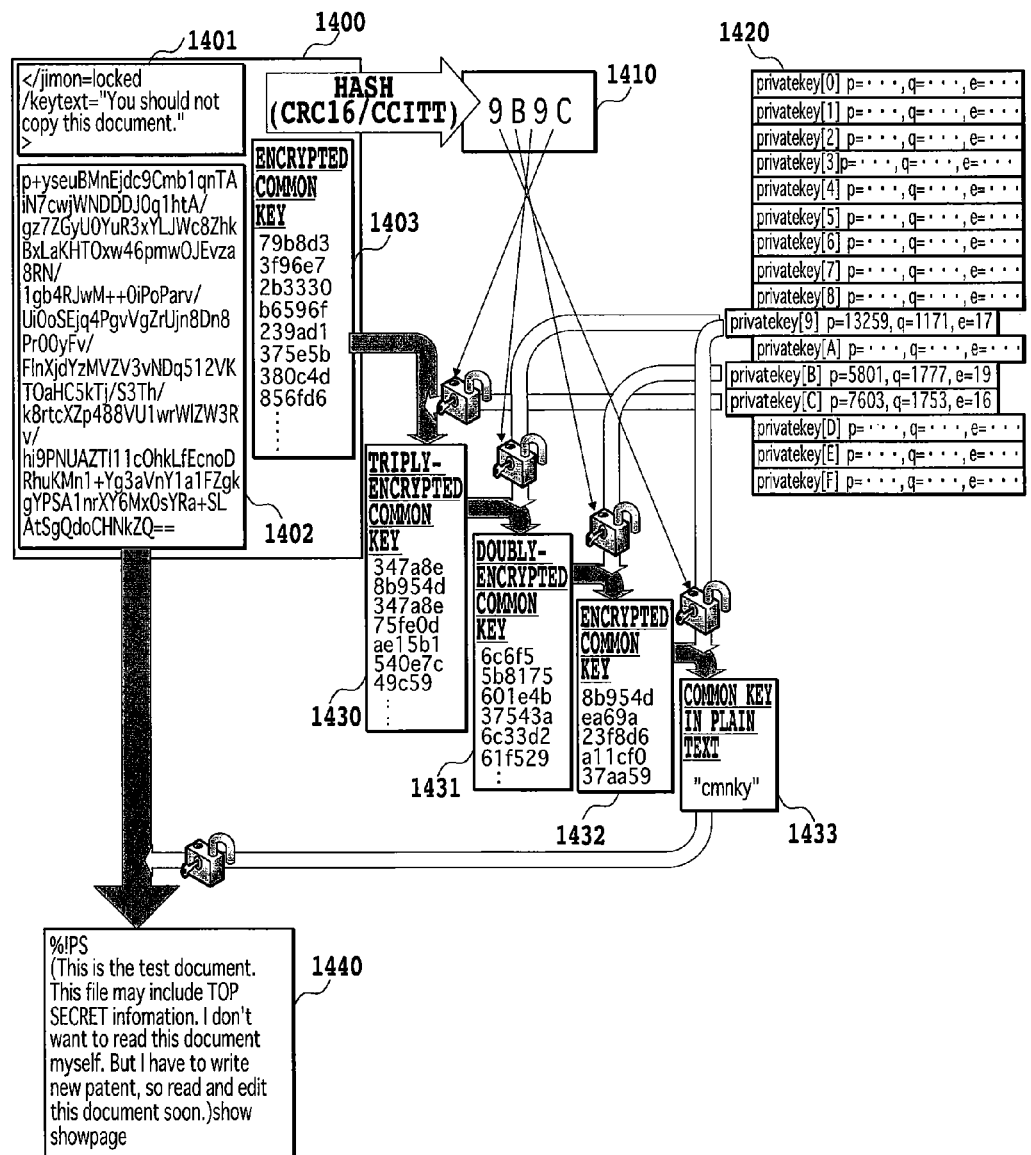
FIG. 14 is a diagram exemplarily illustrating print job data decryption processing in the controller in the second embodiment.

FIG. 12 is an example of flow chart showing processing performed by the controller 100 according to the present embodiment. FIG. 14 is a schematic diagram exemplarily illustrating data decryption processing performed by the controller 100 according to the present embodiment.

In order to generate job data, the host computer 401 transmits a distribution request of a public key set at step S601. After receiving data at step S801, the controller 100 determines whether or not the data is a distribution request of a public key set at step S802. If the data is a distribution request of a public key set, the controller 100 transmits the public key set stored in the built-in ROM 103 to the host computer 401 at step S803. The host computer 401 uses the public key set to encrypt print job data and transmits the encrypted print job data to the controller 100.

The controller 100 receives the data transmitted by the host computer 401 at step S1201. The controller 100 determines whether or not the received data is print job data at step S1202. If the received data is print job data, the controller 100 performs the data separation processing d501. The controller 100 separates the print job data into a print attribute 1401, encrypted PDL data 1402, and an encrypted common key 1403 at step S1203. The print attribute 1401 is "/jimon" specifying the pattern character string and has "locked" indicating "encrypted" attached to the value thereof. Thus, the controller 100 sets pattern output at step S1204 so as to use a character string "You should not copy this document." subsequent to /keytext as the actual pattern character string.

Subsequently, the controller 100 obtains the hash value "9B9C" of a character string subsequent to /keytext at step S1205 in the secret key selection processing d502. Then, at steps S1206 and S1207, the controller 100 knows that there are four secret keys necessary for decrypting the common key 1403 received in an encrypted state and these secret keys are "9", "B", "9", and "C" in order of being used for encryption. The controller 100 sets the counter M used for secret key selection to one at step S1208. At step S1209, the controller 100 selects the secret key corresponding to "C" in the lower M-th digit (=lower first digit) from within a secret key set 1420 and decrypts the quadruply-encrypted common key once by the common key decryption processing d503 to obtain a common key 1430. Subsequently, the controller 100 increments the secret key selection counter M to set M=2 at step S1210. Since the value of M does not exceed four, which is the number of secret keys, at step S1211, the controller 100 returns to step S1209 to select the secret key corresponding to "9" in the lower second digit and decrypts the encrypted common key to obtain a doubly-encrypted common key 1431 in plain text. This processing loop is performed for all digits. Then, M is incremented to M=5 at step S1210. Since M=5 exceeds four, which is the number of secret keys, the controller 100 terminates common key decryption processing at step S1211.

Now that the common key being decrypted, the controller 100 decrypts the encrypted PDL data 1402 using the common key 1431 in plain text by the processing S504 to obtain PDL data 1440 in plain text at step S1212.

Subsequently, the controller 100 interprets the PDL data by the PDL interpretation rendering processing d505 at step S1213. If decryption of the PDL data has failed, the controller 100 detects a PDL syntax error at step S1214 to issue a PDL error at step S1215 or to print out a PDL error by the printing processing d506, which could result in confused content of printing.

DES is used as the common key encryption algorithm, RSA is used as the public key encryption algorithm, and CRC16/CCITT is used as the hash generation algorithm in the above description of the present embodiment. However, these algorithms need not be necessarily used to embody the present invention. Many algorithms satisfying requirements of each of the common key encryption, public key encryption, and hash generation exist and therefore, algorithms may be selected and applied appropriately in accordance with needed cryptographic strength and costs.

[Third Embodiment]

In the third embodiment, a structure in which print attributes or additional information is held as metadata for each rendering object of characters/images as an electronic document data structure will be described with reference to drawings.

<Print Job Data Structure>

Figure 16:
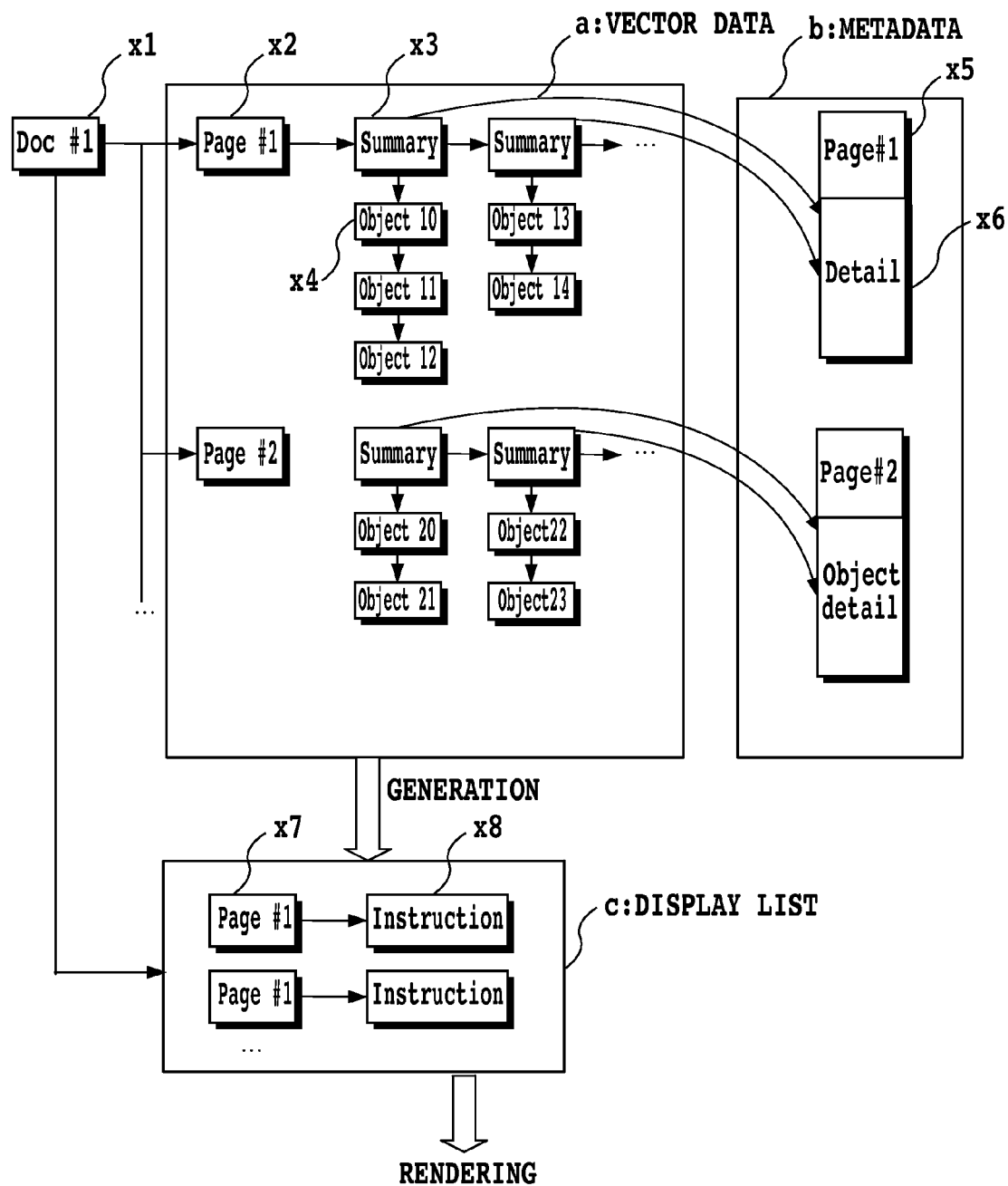
FIG. 16 is a diagram illustrating a data structure of a document in a third embodiment.

FIG. 16 shows an electronic document data structure.

Electronic document data is data consisting of a plurality of pages, and consists principally of vector data (a), metadata (b), and DL (c) and has a hierarchical structure with a document header (x1) at the head thereof. The vector data (a) further includes a page header (x2), summary information (x3), and objects (x5), and the metadata (b) further includes page information (x5) and detailed information (x6). The DL (c) further includes a page header (x7) and instructions for rendering/expansion (x8). The storage location of vector data and that of DL are described in the document header (x1) and thus, the vector data and DL are associated by the document header (x1).

Layout information such as the size and orientation of a page is described in the page header (x2). Each piece of rendering data such as a line, polygon, and Bezier curve is linked in the objects (x4) and a plurality of objects is collectively associated with the summary information (x3). The summary information (x3) summarizes features of the plurality of objects and describes original information of an image area. An image object may be linked as a rendering object (x4).

The metadata (b) is additional information that is not related to rendering processing.

Page information, for example, whether metadata is generated from image mode data or PDL data including character objects is described in the page information (x5) area. Attributes related to security and character strings (character code strings) generated as additional information are described in the detailed information (x6). Metadata is referenced from the summary information (x3) of the vector data (a) and the detailed information (x6) can be found from the summary information (x3).

The DL (c) is intermediate code for a renderer to expand bitmaps. A control table of rendering information (instructions) in the page or the like is described in the page header (x7) and the instructions (x8) include resolution dependent rendering information.

In the electronic document data structure, the vector data (a) and DL (c) correspond to the encrypted PDL data 942. The print attribute 941 is described in the document header (x1) and can be described, at the same time, in the detailed information (x6) of metadata. Further, the encrypted common key 943 is also described in the detailed information (x6) of metadata.

If a print attribute is described in the document header (x1), the print attribute is applied to a whole electronic document and also the same encrypted common key 943 in the detailed information (x6) of metadata is used in the same document.

If a print attribute is described in the detailed information (x6) of metadata, the print attribute is applied only to a plurality of rendering objects (x4) summarized by the corresponding summary information (x3). Even if the common key 930 in plain text used for encryption is the same, the common key 943 encrypted based on the print attribute will be different for each piece of the summary information (x3).

Figure 17:
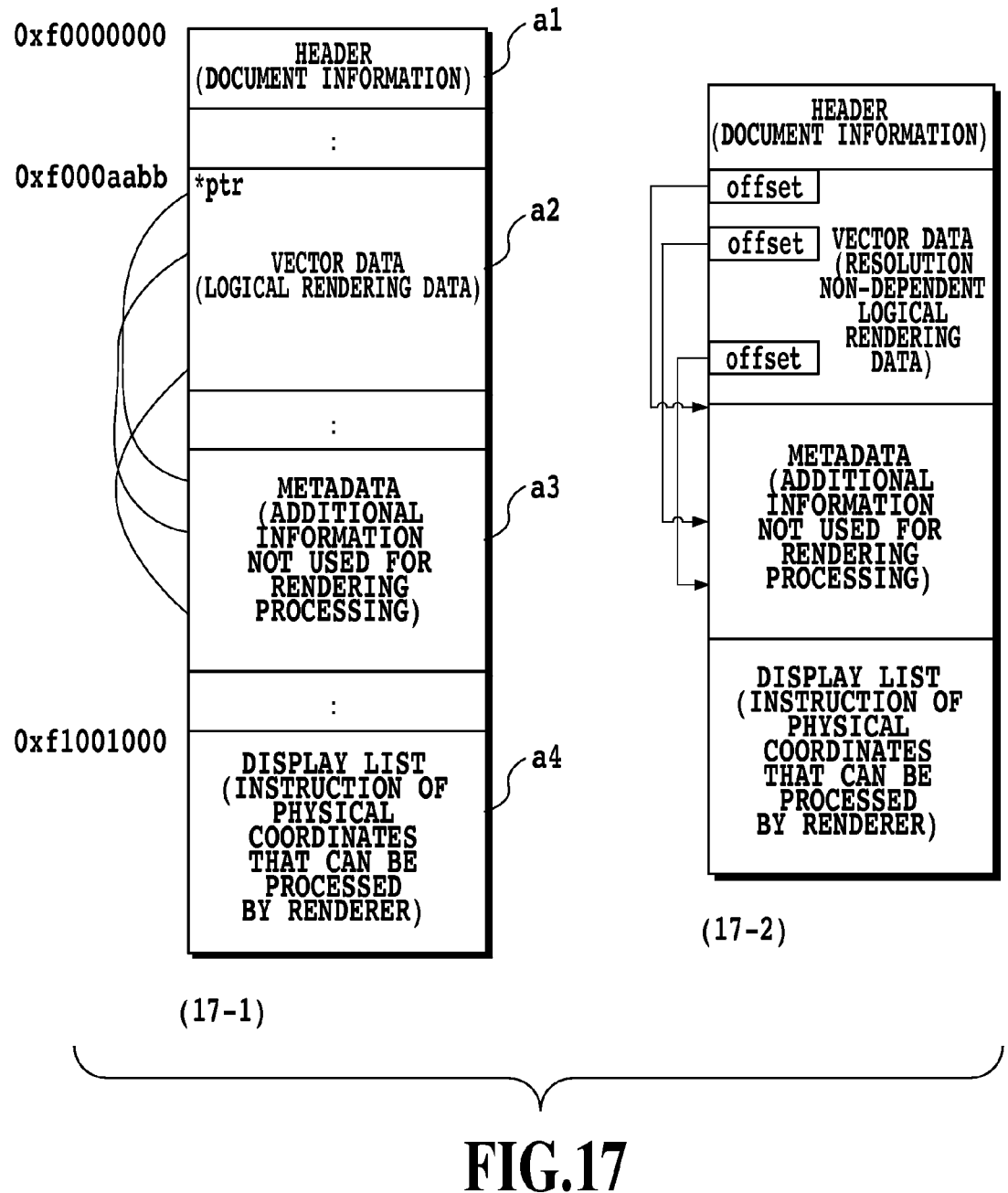
FIG. 17 is a diagram illustrating a storage structure of a document in the third embodiment.

FIG. 17 is a diagram showing how the data structure illustrated in FIG. 16 is allocated in a memory and a file.

As shown in 17-1, the vector data area, metadata area, and DL area of electronic document data are allocated to any address in a memory.

As shown in 17-2, the vector data area, metadata area, and DL area of electronic document data are serialized in one file.

[Other Embodiments]

Various embodiments have been described above, but the present invention may be applied to a system consisting of a plurality of devices or equipment consisting of one device. For example, the present invention may be applied to a scanner, printer, personal computer, copying machine, multi-function apparatus, or facsimile machine.

The present invention is also achieved by supplying a software program realizing each function of the aforementioned embodiments to a system or equipment directly or remotely and causing a computer included in the system to read and execute the supplied program code. Therefore, program code itself installed on the computer to realize functions/processing of the present invention by the computer also realizes the present invention. That is, a computer program itself to realize the functions/processing is also a kind of the present invention. In this case, if a function of program is provided, the form of program whether object code, a program executed by an interpreter, or script data supplied to the OS does not matter.

Computer readable recording media to supply a program include, for example, a flexible disk, hard disk, optical disk, magneto optical disk, MO, CD-ROM, CD-R, and CD-RW. Computer readable recording media also include a magnetic tape, non-volatile memory card, ROM, and DVD (DVD-ROM, DVD-R).

A program may also be downloaded from a website of the Internet/intranet using a browser of a client computer. That is, the computer program itself of the present invention or a compressed file including an auto-installation function may be downloaded from the website to a recording medium such as a hard disk. The present invention can also be realized by dividing program code constituting a program of the present invention into a plurality of files and downloading each file of the program from different websites. That is, a WWW server causing a plurality of users to download program files to realize functions/processing of the present invention may also become a constituent feature of the present invention.

A program of the present invention may be distributed to users after being encrypted and stored in a recording medium such as CD-ROM. In this case, only users who fulfill predetermined conditions may be allowed to download key information for resolving encryption from the website via the Internet/intranet so that the program encrypted by using the key information is decrypted for installation on a computer.

Functions of the aforementioned embodiments may also be realized by a read program being executed by a computer. Incidentally, a portion or all of actual processing may be performed by the OS or the like operating on the computer based on instructions of the program. Also in this case, functions of the aforementioned embodiments can be realized.

Further, a program read from a recording medium may be written into a memory provided in an expansion board inserted into a computer or an expansion unit connected to the computer. A portion or all of actual processing may be performed by a CPU or the like provided at the expansion board or expansion unit based on instructions of the program. Functions of the aforementioned embodiments may be realized in this manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structure and functions.

This application claims the benefit of Japanese Patent Application No. 2008-53908, filed Mar. 4, 2008 which is hereby incorporated by reference herein in its entirety.

What is claimed is:

1. An information processing apparatus for transmitting print data to a single other apparatus via a network, comprising:
a memory; and
at least one hardware processor, wherein the processor functions as
receiving logic that receives a public key set including a plurality of public keys from the single other apparatus, the public key set being paired with a secret key set held by the single other apparatus;
generating logic that generates a common key; a first encrypting unit that encrypts print data using the common key;
selecting logic that selects, based on a print attribute of the print data, a public key from the plurality of public keys included in the public key set received by the receiving logic from the single other apparatus, wherein the print attribute is a numerical value indicating an upper limit of the number of print copies which is set for the print data and represented as a combination of numbers or characters;
second encrypting logic that encrypts the common key using the public key selected by the selecting logic; and
transmitting logic that transmits the encrypted print data encrypted by the first encrypting logic, the encrypted common key encrypted by the second encrypting logic, and the print attribute to the single other apparatus, wherein the transmitted print attribute is not encrypted,
wherein, said selecting logic selects a subset of public keys corresponding to each divided number or character of the print attribute from the plurality of public keys included in the public key set, and wherein said second encrypting logic encrypts the common key using the selected subset of public keys.

2. The information processing apparatus according to claim 1, wherein said second encrypting logic performs multiple encryption on the common key using the selected subset of public keys in turn.

3. The information processing apparatus according to claim 1, wherein the print data is document or image data, the print attribute is the upper limit of the number of print copies, and the single other apparatus has a printer function.

4. The information processing apparatus according to claim 1, wherein said selecting logic selects the public key having a key number corresponding to the print attribute, from the plurality of public keys included in the public key set.

5. The information processing apparatus according to claim 1, wherein the hardware processor further functions as updating logic that updates the print attribute by adding information indicating that the print data has been encrypted to the print attribute,
wherein said transmitting logic transmits the encrypted print data, the encrypted common key, and the updated print attribute to the single other apparatus, wherein the updated print attribute is not encrypted.

6. An information processing apparatus comprising:
a memory; and
at least one hardware processor, wherein the processor functions as holding logic that holds a secret key set including a plurality of secret keys, the secret key set being paired with a public key set;

data receiving logic that receives, from another information processing apparatus, encrypted print data which have been obtained by encrypting print data with a common key, a print attribute of the print data, and an encrypted common key that has been obtained by encrypting the common key with a public key that is selected, based on the print attribute of the print data, from a plurality of public keys included in the public key set that is paired with the secret key set held by the holding logic, wherein the print attribute is a numerical value indicating an upper limit of the number of print copies which is set for the print data and represented as a combination of numbers or characters, and wherein the print attribute is not encrypted;

secret key selecting logic that selects, based on the print attribute received by the data receiving logic, a secret key from the plurality of secret keys included in the secret key set held by the holding logic;

first decrypting logic that decrypts the encrypted common key using the selected secret key; and second decrypting logic that decrypts the encrypted print data using the decrypted common key decrypted by the first decrypting logic, wherein said secret key selecting logic divides the numerical value into a plurality of numbers or characters and selects a subset of secret keys corresponding to each divided number or character from the plurality of secret keys included in the secret key set, and wherein said first decrypting logic decrypts the encrypted common key using the selected subset of secret keys.

7. The information processing apparatus according to claim 6, wherein said first decrypting logic decrypts the encrypted common key using the selected subset of secret keys in turn.

8. The information processing apparatus according to claim 6, wherein the print data is document or image data, the print attribute is the upper limit of the number of print copies, and said information processing apparatus has a printer function.

9. A system in which a first information processing apparatus and a single other apparatus mutually transmit and receive data via a network, the first information processing apparatus, comprising:

a memory; and at least one hardware processor, wherein the processor of the first information processing apparatus functions as receiving logic that receives a public key set including a plurality of public keys from the single other apparatus, the public key set being paired with a secret key set held by the single other apparatus;

generating logic that generates a common key;

first encrypting logic that encrypts print data using the common key generated by the generating logic;

public key selecting logic that selects, based on a print attribute of the print data, a public key from the plurality of public keys included in the public key set received by the receiving logic, wherein the print attribute is a numerical value indicating an upper limit of the number of print copies which is set for the print data and represented as a combination of numbers or characters;

second encrypting logic that encrypts the common key using the public key selected by the selecting logic; and transmitting logic that transmits the encrypted print data encrypted by the first encrypting logic, the encrypted common key encrypted by the second encrypting logic, and the print attribute to the single other apparatus via the network, wherein the transmitted print attribute is not encrypted, wherein said public key selecting logic selects a subset of public keys corresponding to each divided number or character of the print attribute from the plurality of public keys included in the public key set, and wherein said second encrypting logic encrypts the common key using the selected subset of public keys; and the single other apparatus, comprising:

a memory; and at least one hardware processor, wherein the processor of the single other apparatus functions as holding logic that holds a secret key set including a plurality of secret keys, the secret key set being paired with the public key set;

data receiving logic that receives the encrypted print data, and the print attribute, which are transmitted from the transmitting logic of the first information processing apparatus via the network;

secret key selecting logic that selects, based on the print attribute received by the data receiving logic, a secret key from the plurality of secret keys included in the secret key set;

first decrypting logic that decrypts the encrypted print data using the selected secret key; and second decrypting logic that decrypts the encrypted print data using the decrypted common key decrypted by the first decrypting logic, wherein said secret key selecting logic selects a subset of secret keys corresponding to each of the divided number or character of the print attribute from the plurality of secret keys included in the secret key set, and wherein said first decrypting logic decrypts the encrypted common key using the selected subset of secret keys.

10. The system according to claim 9, wherein the print data is document or image data, the print attribute is an upper limit of the number of print, and the single other apparatus has a printer function.

11. An information processing method by which an information processing apparatus transmits print data to a single other apparatus via a network, the method comprising the steps of:

receiving a public key set including a plurality of public keys from the single other apparatus, the public key set being paired with a secret key set held by the single other apparatus;

generating a common key; encrypting print data using the common key;

selecting, based on a print attribute of the print data, a public key from the plurality of public keys included in the received public key set, wherein the print attribute is a numerical value indicating an upper limit of the number of print copies which is set for the print data and represented as a combination of numbers or characters;

encrypting the common key using the selected public key; and transmitting data including the encrypted print data, the encrypted common key, and the print attribute to the single other apparatus, wherein the print attribute is not encrypted~ wherein said selecting step selects a subset of public keys corresponding to each divided number or character of the print attribute from the plurality of public keys included in the public key set; and wherein said step of encrypting the common key encrypts the common key using the selected subset of public keys.

12. An information processing method executed by an information processing apparatus holding a secret key set including a plurality of secret keys, the secret key set being paired with a public key set used by another information processing apparatus, the method comprising the steps of:

receiving, from the another information processing apparatus, encrypted print with a common key, a print attribute generated for the print data and an encrypted common key which has been obtained by encrypting the common key with a public key that is selected, based on the print attribute of the print data, from the plurality of public keys included in the public key set that is paired with the secret key set held by holding logic, wherein the print attribute is a numerical value indicating an upper limit of the number of print copies which is set for the print data and represented as a combination of numbers or characters, and wherein the print attribute is not encrypted;

selecting, based on the print attribute received in the receiving step, a secret key from the plurality of secret keys included in the secret key set;

decrypting the encrypted common key using the selected secret key; and decrypting the encrypted print data using the decrypted common key, wherein said selecting step divides the numerical value into a plurality of numbers or characters and selects a subset of secret keys corresponding to each divided number or character from the plurality of secret keys included in the secret key set, and wherein said step of decrypting the encrypted common key decrypts the encrypted common key using the selected subset of secret keys.

13. A non-transitory computer-readable recording medium having computer-executable instructions for performing an information processing method by which an information processing apparatus transmits print data to a single other apparatus via a network, the method comprising the steps of:

receiving a public key set including a plurality of public keys from the single other apparatus, the public key set being paired with a secret key set held by the single other information processing apparatus;

generating a common key;

encrypting print data using the common key;

selecting, based on a print attribute of the print data, a public key from the plurality of public keys included in the received public key set, wherein the print attribute is a numerical value indicating an upper limit of the number of print copies which is set for the print data and represented as a combination of numbers or characters;

encrypting the common key using the selected public key; and transmitting data including the encrypted print data, the encrypted common key, and the print attribute to the single other apparatus, wherein the print attribute is not encrypted, wherein said selecting step selects a subset of public keys corresponding to each divided number or character of the print attribute from the plurality of public keys included in the public key; and wherein said step of encrypting the common key encrypts the common key using the selected subset of public keys.

14. A non-transitory computer-readable recording medium having computer-executable instructions for causing an information processing apparatus holding a secret key set including a plurality of secret keys, the secret key set being paired with a public key set used by another information processing apparatus, to perform a method comprising the steps of:

receiving, from the another information processing apparatus, encrypted print with a common key, a print attribute generated for the print data, and an encrypted common key which has been obtained by encrypting the common key with a public key that is selected, based on the print attribute of the print data, from the plurality of public keys included in the public key set that is paired with the secret key set held by holding logic, wherein the print attribute is a numerical value indicating an upper limit of the number of print copies which is set for the print data and represented as a combination of numbers or characters, and wherein the print attribute is not encrypted;

selecting, based on the print attribute received in the receiving step, a secret key from the plurality of secret keys included in the secret key set;

decrypting the encrypted common key using the selected secret key; and decrypting the encrypted print data using the decrypted common key:

wherein said selecting step divides the numerical value into a plurality of numbers or characters and selects a subset of secret keys corresponding to each divided number or character from the plurality of secret keys included in the secret key set, and wherein said step of decrypting the encrypted common key decrypts the encrypted common key using the selected subset of secret keys.

15. An information processing apparatus for transmitting print data to a single other apparatus via a network, said apparatus comprising:

a memory; and at least one hardware processor, wherein the processor functions as receiving logic that receives a public key set including a plurality of public keys from the single other apparatus, the public key set being paired with a secret key set held by the single other apparatus;

generating logic that generates a common key;

first encrypting logic that encrypts print data using the common key;

selecting logic that selects, based on a print attribute of the print data, a public key from the plurality of public keys included in the public key set received by the receiving logic from the single other apparatus, wherein the print attribute is a character string used for a copy forgery inhibited pattern image;

second encrypting logic that encrypts the common key using the public key selected by the selecting logic; and transmitting logic that transmits the encrypted print data encrypted by the first encrypting logic, the encrypted common key encrypted by the second encrypting logic, and the print attribute to the single other apparatus, wherein the transmitted print attribute is not encrypted;

wherein said selecting logic calculates a hash value from the character string, divides the hash value into a plurality of numbers or characters, and selects a subset of public keys corresponding to each divided number or character from the plurality of public keys included in the public key set, and wherein said second encrypting logic encrypts the common key using the selected subset of public keys.

* * * * *